United States Patent [19]

Sasaki et al.

[11] Patent Number: 5,774,290

[45] Date of Patent: Jun. 30, 1998

[54] REPRODUCING APPARATUS FOR VARYING CLOCK FREQUENCIES BASED UPON AZIMUTH ANGLES OF A PLURALITY OF HEADS

[75] Inventors: Yoshiyuki Sasaki, Kanagawa-ken; Yasuyuki Tanaka, Tokyo, both of Japan

[73] Assignee: Canon Kabushiki Kaisha, Tokyo, Japan

[21] Appl. No.: 857,373

[22] Filed: May 16, 1997

Related U.S. Application Data

[63] Continuation of Ser. No. 510,477, Aug. 2, 1995, abandoned.

[30] Foreign Application Priority Data

Aug. 9, 1994 [JP] Japan .................................. 6-187246
Jul. 12, 1995 [JP] Japan .................................. 7-176132

[51] Int. Cl.$^6$ ...................................................... G11B 5/09
[52] U.S. Cl. .............................................. 360/51; 386/46
[58] Field of Search ................................. 360/46, 51, 64, 360/65, 22, 37.1, 35.1, 10.3, 77.05, 19.1, 18, 9.1, 77.13, 77.14, 77.15; 358/323, 324, 310, 335; 386/90, 72, 104, 73, 74, 46

[56] References Cited

U.S. PATENT DOCUMENTS 4,030,130  6/1977  Smith .................................. 360/77.05
5,255,128  10/1993  Inoue et al. .............................. 360/40
5,321,557  6/1994  Shimotashiro et al. ......... 360/77.14 X

*Primary Examiner*—Aristotelis M. Psitos
*Assistant Examiner*—Patrick Wamsley
*Attorney, Agent, or Firm*—Robin, Blecker & Daley

[57] ABSTRACT

The present invention is applicable to an apparatus which is arranged to reproduce a signal from a recording medium by using a plurality of heads each having a different azimuth angle and which includes a PLL circuit formed by an oscillator, a phase-difference detector for detecting a phase difference between an output clock signal of the oscillator and the reproduced signal, and a loop filter for receiving an output of the phase-difference detector. The present invention generates a clock signal phase-synchronized with the reproduced signal, by detecting an oscillation frequency error of the oscillator relative to a target frequency, integrating the oscillation frequency error together with an output of the loop filter to provide an integral output, adding the integral output to the output of the loop filter and inputting an addition result to the oscillator, and varying an operation for detecting the oscillation frequency error, according to the azimuth angle of each of the plurality of heads.

43 Claims, 14 Drawing Sheets

F I G. 7
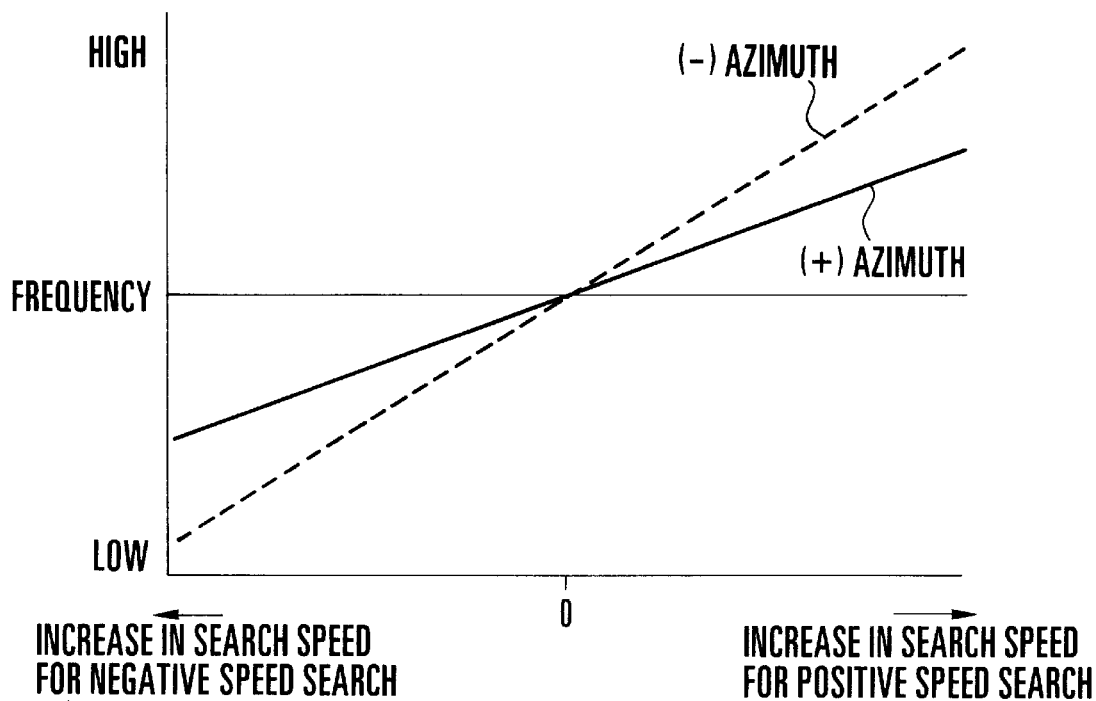
F I G. 8
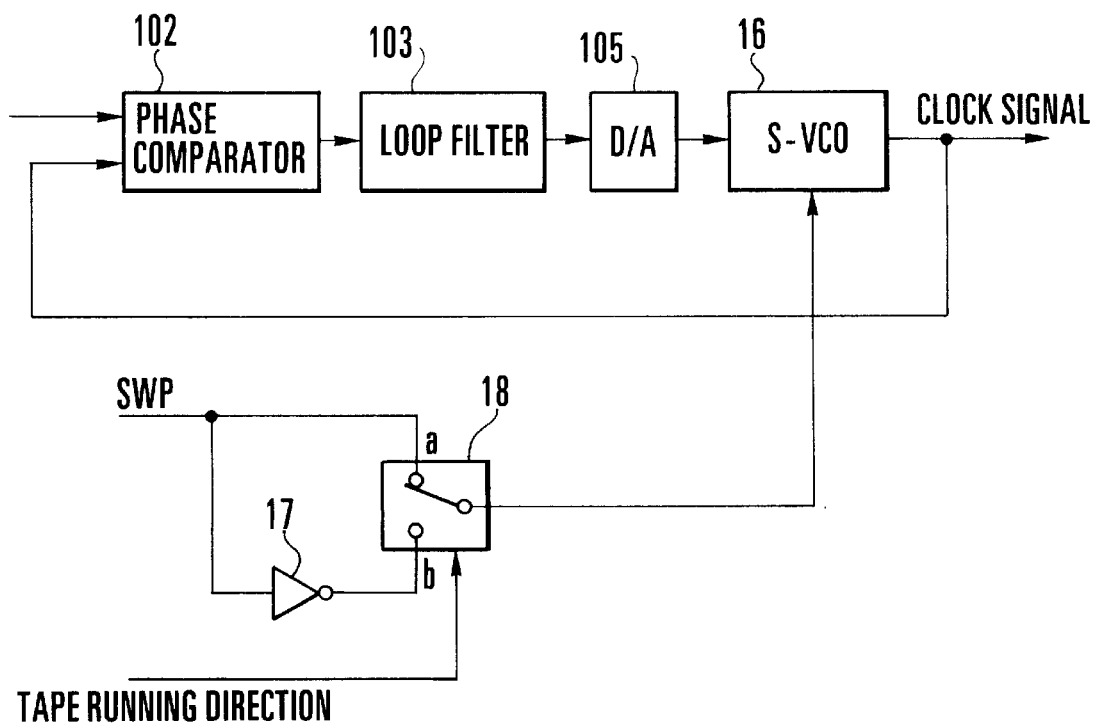

F I G. 12
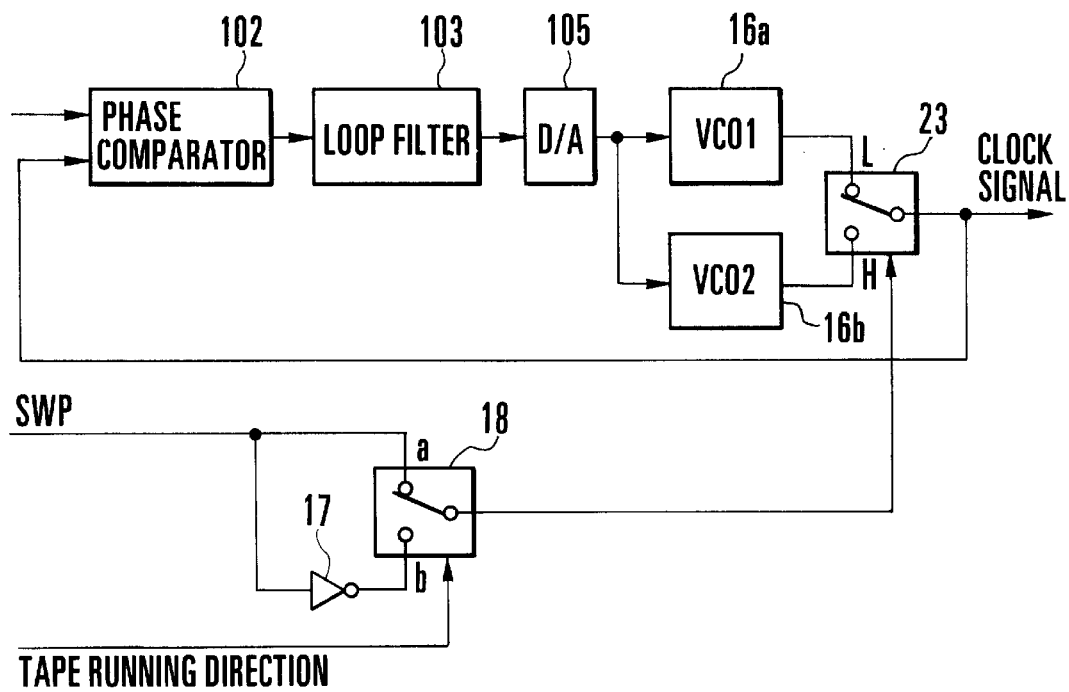
F I G. 13
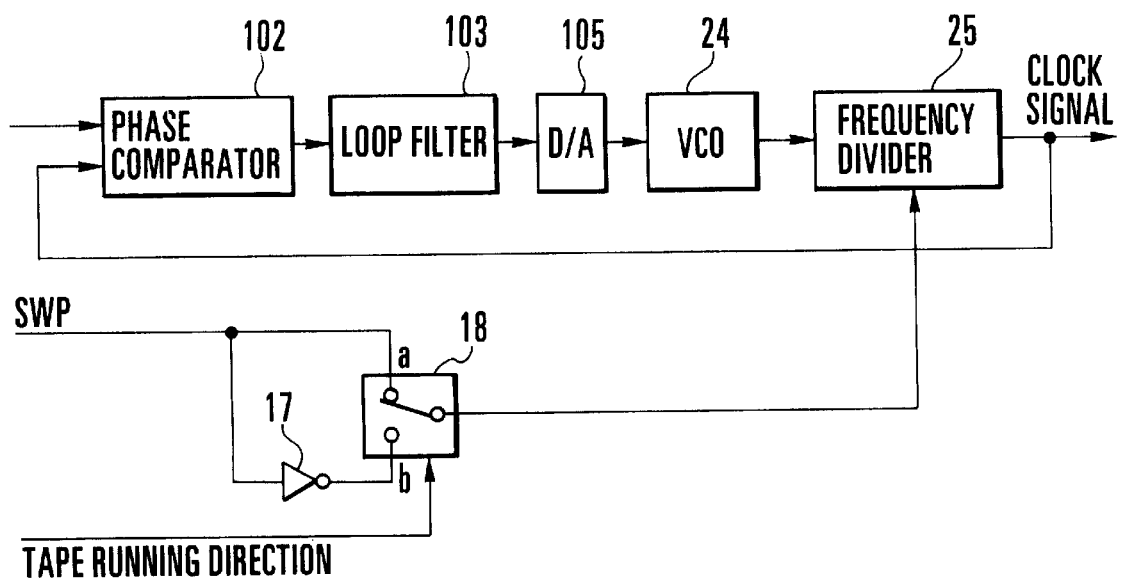

F I G. 14
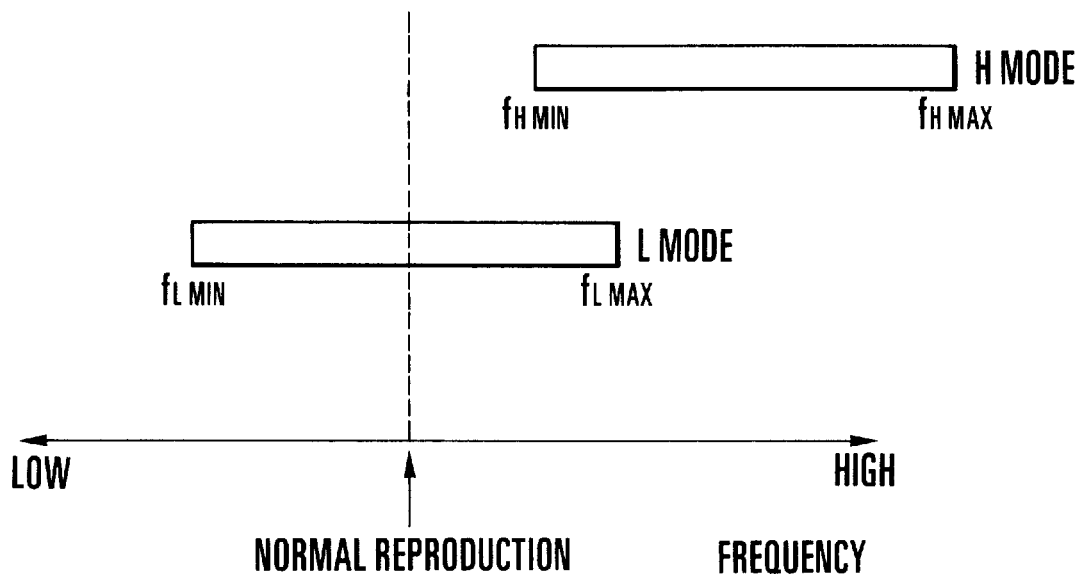

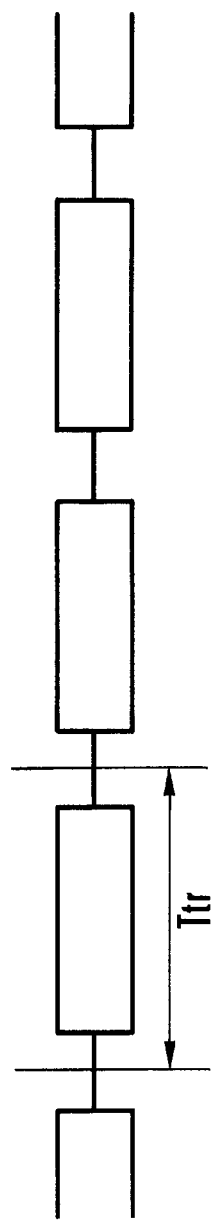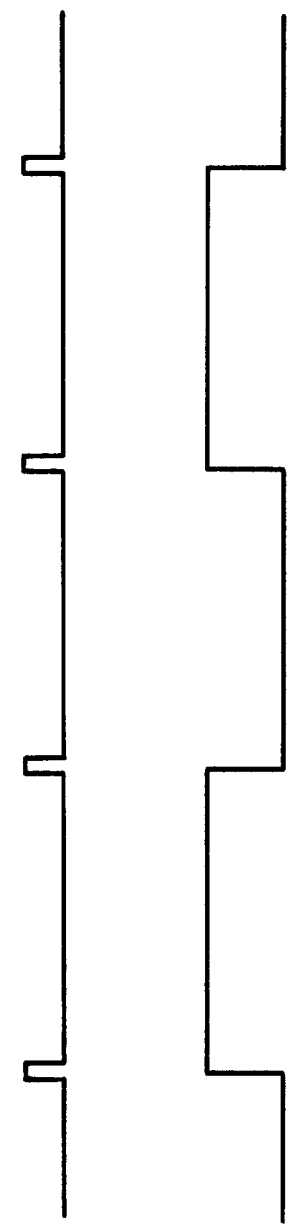
F I G. 16(a)
F I G. 16(b)
F I G. 16(c)
F I G. 16(d)
F I G. 16(e)

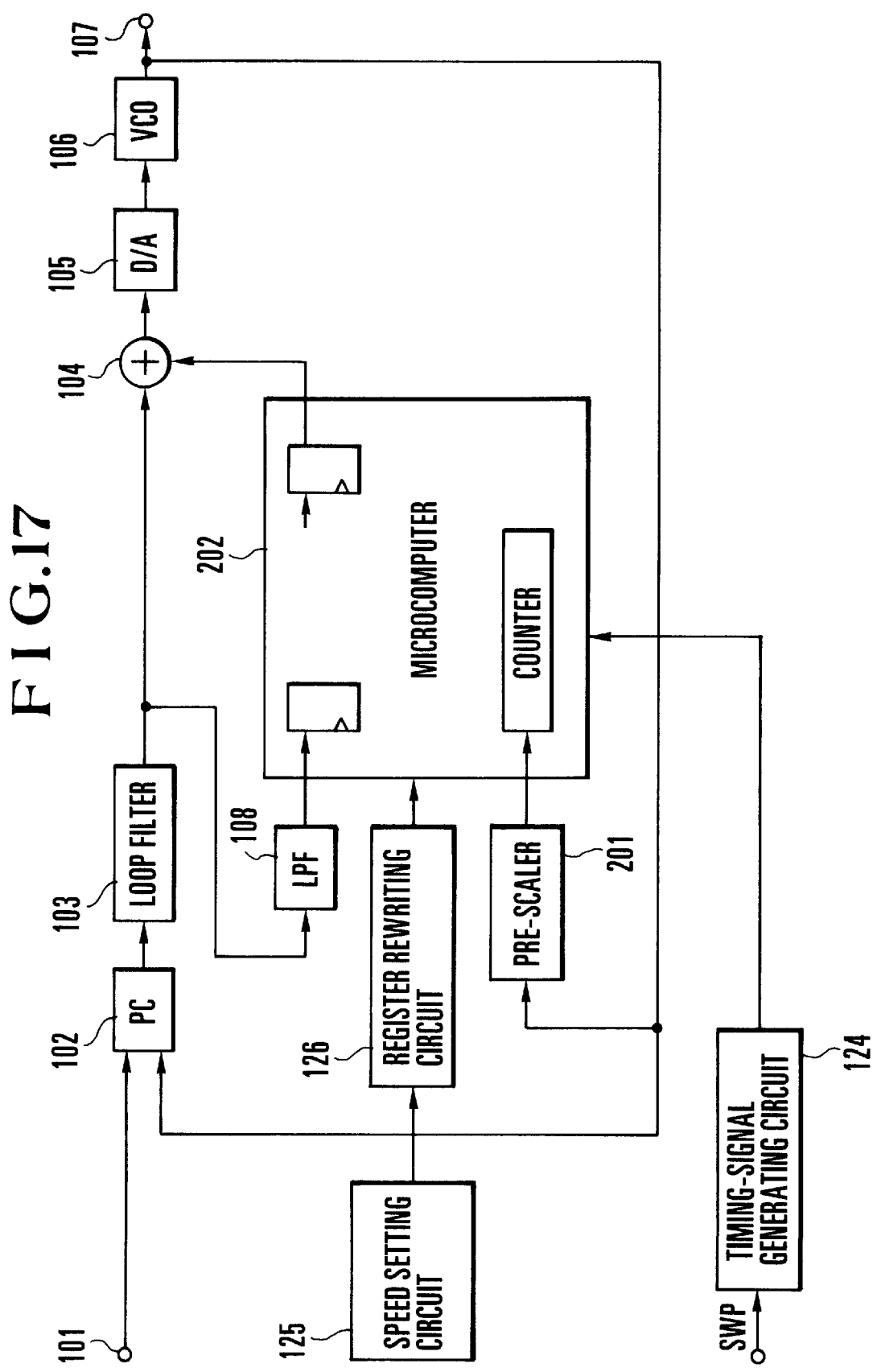

REPRODUCING APPARATUS FOR VARYING CLOCK FREQUENCIES BASED UPON AZIMUTH ANGLES OF A PLURALITY OF HEADS

This is a continuation application under 37 CFR 1.62 of prior application Ser. No. 08/510,477, now abandoned, filed Aug.2, 1995.

BACKGROUND OF THE INVENTION

1. Field of the Invention

The present invention relates to a reproducing apparatus and, more particularly, to an apparatus for reproducing a clock signal from a digital signal reproduced from a recording medium.

2. Description of the Related Art

It has heretofore been known that a phase-locked loop (hereinafter referred to as "PLL") circuit is used to extract a clock signal from a received data train in an apparatus, such as a digital VTR, which transmits (records and reproduces) data at high speed.

FIG. 1 schematically shows the PLL circuit. Referring to FIG. 1, a signal reproduced from magnetic tape (not shown) is inputted to a phase comparator 102, and the phase comparator 102 detects a phase difference between the reproduced signal and a clock signal outputted from a voltage controlled oscillator (hereinafter referred to as "VCO") 106. The output of the phase comparator 102 is inputted to the VCO 106 via a loop filter 103, and the VCO 106 outputs as a clock signal a signal having a frequency corresponding to the output voltage of the loop filter 103.

Specifically, if the phase of the reproduced digital signal varies owing to rotational fluctuations of a rotary head (not shown) or expansion or contraction of the magnetic tape, a phase difference between the reproduced digital signal and the generated clock signal is detected by the phase comparator 102, and the phase difference is fed back to the VCO 106 via the loop filter 103 to control the oscillation frequency of the VCO 106. In this manner, it is possible to generate a clock signal which follows the phase variations of the reproduced digital signal.

Problems involved in high-speed reproduction which is called "picture search" will be described below.

Normally, in digital VTRs, magnetic heads of different azimuth angles are used to perform guardband-less recording in order to achieve high-density recording.

Although no problem occurs during normal reproduction, the picture search involves the problem that speed components, which are normal to the respective azimuth angles, vary between the azimuth angles. For example, the frequency of a signal reproduced by a magnetic head of plus azimuth and the frequency of a signal reproduced by a magnetic head of minus azimuth are shifted from each other in such a manner that either of the frequencies is shifted toward a higher frequency side and the other is shifted toward a lower frequency side according to the search speed.

Accordingly, in a conventional arrangement using two magnetic heads of different azimuth angles, the rotational speed of a rotary drum is controlled to keep constant the average value of the relative speeds between the two magnetic heads and magnetic tape so that the frequencies of the reproduced signals can be made closer to those obtainable during normal reproduction.

However, even with such control, as the search speed becomes higher, the difference between the reproduced signals due to the difference between the two azimuth angles becomes larger, for example, ±1% of the oscillation frequency in the case of a hundred times search speed. This leads to the problem that the difference between the reproduced signals deviates from the lock range of the PLL.

As a result, no accurate clock signals can be generated during the high-speed search, so that no good reproduced signal can be obtained.

In addition, to obtain a good reproduced signal, it is necessary to perform a low-speed search.

SUMMARY OF THE INVENTION

It is, therefore, an object of the present invention to solve the above-described problems.

Another object of the present invention is to provide an apparatus capable of producing a clock signal accurately following the frequency of a reproduced signal, even during special reproduction such as a high-speed search.

To achieve the above objects, in accordance with one aspect of the present invention, there is provided a reproducing apparatus which comprises reproducing means for reproducing a signal from a recording medium by using a plurality of heads each having a different azimuth angle, generating means for generating a clock signal phasesynchronized with the reproduced signal, and controlling means for controlling a clock-signal generating operation of the generating means according to the azimuth angle of each of the plurality of heads.

Another object of the present invention is to provide an apparatus capable of stably generating a clock signal by means of a simple arrangement and construction.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 7 is a graph showing variations in the frequencies of reproduced signals with respect to the transport speed of magnetic tape;

FIG. 8 is a block diagram showing an example of the construction of the clock-signal generating circuit shown in FIG. 2;

FIG. 12 is a block diagram showing another construction of the clock-signal generating circuit shown in FIG. 2;

FIG. 13 is a block diagram showing another construction of the clock-signal generating circuit shown in FIG. 2;

FIG. 14 is a schematic view aiding in describing the operation of the circuit shown in FIG. 8;

FIGS. 16(a) to 16(e) are timing charts aiding in describing the operation of the circuit shown in FIG. 15;

FIG. 17 is a block diagram showing another construction of the clock-signal generating circuit of FIG. 2 according to a third embodiment of the present invention;

DETAILED DESCRIPTION OF THE PREFERRED EMBODIMENTS:

Preferred embodiments of the present invention will be described below with reference to the accompanying drawings.

Figure 2:
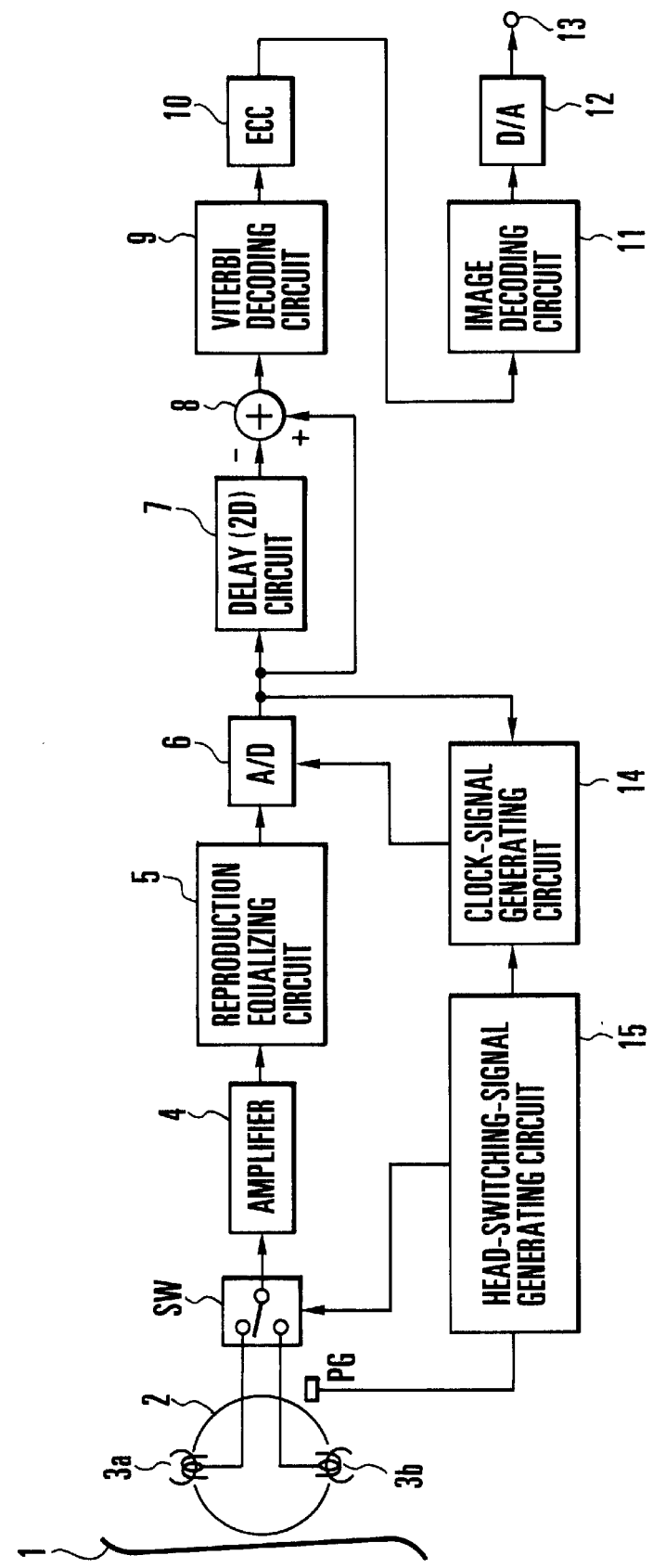
FIG. 2 is a block diagram showing the construction of a digital VTR according to a first embodiment of the present invention.

In the description of a first embodiment, reference will be made to an example in which the present invention is applied to a digital VTR. FIG. 2 is a block diagram schematically showing the arrangement of the reproducing system of the digital VTR.

In the arrangement shown in FIG. 2, magnetic heads 3a and 3b mounted on a rotary drum 2 alternately trace a magnetic tape 1 to reproduce a digital signal, and output the digital signal to an amplifier 4 through a switch SW. The digital signal is amplified by the amplifier 4 and outputted to a reproduction equalizing circuit 5. Although the digital VTR according to the first embodiment is arranged to record a video signal for one frame on ten tracks, another arrangement may, of course, be adopted.

The reproduction equalizing circuit 5 is an equalizing circuit for compensating for variations in signal characteristics occurring in a magnetic recording/reproducing system, and performs so-called integral equalization. The reproduced signal equalized by the reproduction equalizing circuit 5 is outputted to an A/D converter 6.

The A/D converter 6 performs sampling to convert the equalized reproduced signal into a digital signal, and outputs the digital signal to a clock-signal generating circuit 14 and a delay circuit 7. The delay circuit 7 delays the digital signal by the period of two clock signals, and a subtracter 8 subtracts the original digital signal from the delayed digital signal. The process of converting the reproduced digital signal into the digital signal by the A/D converter 6 will be described below more specifically. Since the reproduced signal supplied from the switch SW is a digital signal the amplitude of which varies in analog form, the digital signal having such an amplitude of analog form is converted into a digital signal consisting of a plurality of bits per sample by the A/D converter 6, and this digital signal is restored to a two-level signal represented by "1" and "o" by a Viterbi decoding circuit 9 which is provided at the rear stage of the subtracter 8.

The reproduced signal waveform equalized by the reproduction equalizing circuit 5 through the integration equalization is converted into a waveform having a PR (Partial Response) (1, 0, −1) characteristic through the aforesaid subtraction, and this waveform is subjected to maximum likelihood decoding by the Viterbi decoding circuit 9. The combination of PR (1, 0, −1) techniques and Viterbi decoding is widely used in digital VTRs, etc., which employ high-density magnetic recording, because it is possible to minimize transmission error by compensating for the disadvantages (a degradation in S/N ratio, a waveform distortion, etc.) of the low-frequency characteristics of a magnetic recording system.

The clock-signal generating circuit 14 generates not only a clock signal for use in the A/D converter 6, but also operation clock signals for use in individual parts of the apparatus. The operation of the clock-signal generating circuit 14 will be described later in detail.

The reproduced data restored by the Viterbi decoding circuit 9 is supplied to an error correcting circuit (ECC circuit) 10, in which the error which has occurred in the reproduced data on a transmission path is corrected by employing the parity data added to the data during recording. The thus-corrected reproduced data is outputted to an image decoding circuit 11. The image decoding circuit 11 expands the amount of information of the reproduced data compressed during recording, and outputs the expanded reproduced data to a D/A converter 12. The D/A converter 12 converts the input digital data into analog data, and outputs analog data through an output terminal 13.

A head-switching-signal generating circuit 15 generates a head switching signal for switching the magnetic heads 3a and 3b (hereinafter referred to as "SWP") on the basis of a signal (PG) indicative of the rotational phase of the rotary drum (rotary head) 2, and outputs the signal SWP to the switch SW and the clock-signal generating circuit 14.

The relationship between the magnetic heads 3a and 3b and the magnetic tape 1 during search reproduction and a variation in the frequency of the reproduced signal will be described below.

If azimuth recording is performed with the magnetic heads of the magnetic heads 3a and 3b of FIG. 2 being inclined at different angles with respect to the head scanning direction, unique phenomena which will be described below are observed.

Figure 3:
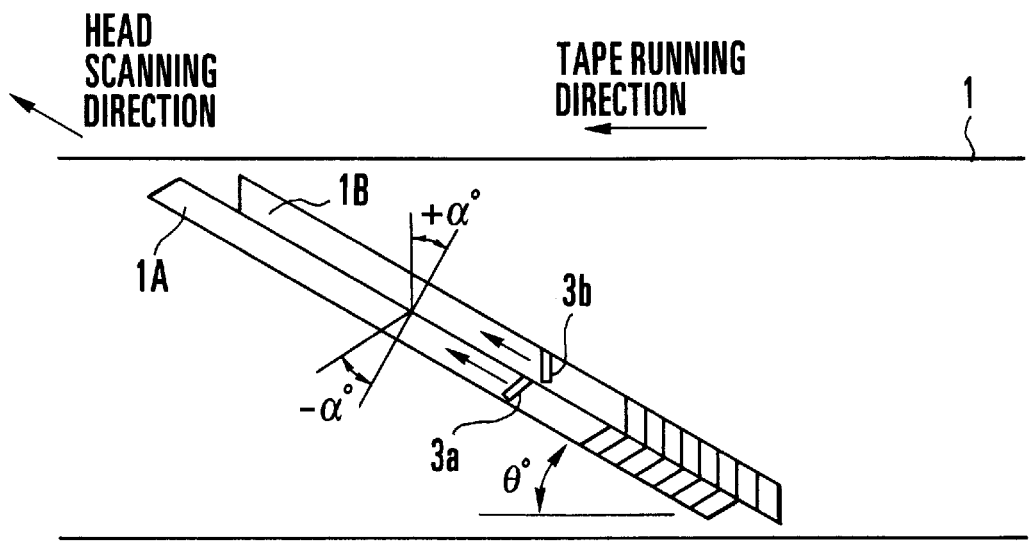
FIG. 3 is a schematic view showing the relationship between tracks and heads in the first embodiment of the present invention.

FIG. 3 is a schematic view showing the magnetic-recording-medium side of the magnetic tape 1. The running direction of the magnetic tape 1 and the scanning direction of each of the magnetic heads 3a and 3b are selected as shown in FIG. 3. The azimuth angle of the magnetic head 3a is $-\alpha°$, the azimuth angle of the magnetic head 3b is $+\alpha°$ and the track inclination angle is $\theta°$.

The running speed of the magnetic tape 1 and the rotational speed of the rotary drum 2 are controlled so that the magnetic heads 3a and 3b scan a track 1A of minus azimuth and a track 1B of plus azimuth, respectively, when normal reproduction (reproduction from magnetic tape which is performed while causing the magnetic tape to run at the same speed as that used for recording) is being performed from tracks formed at the track inclination angle $\theta°$ during recording.

Figure 4:
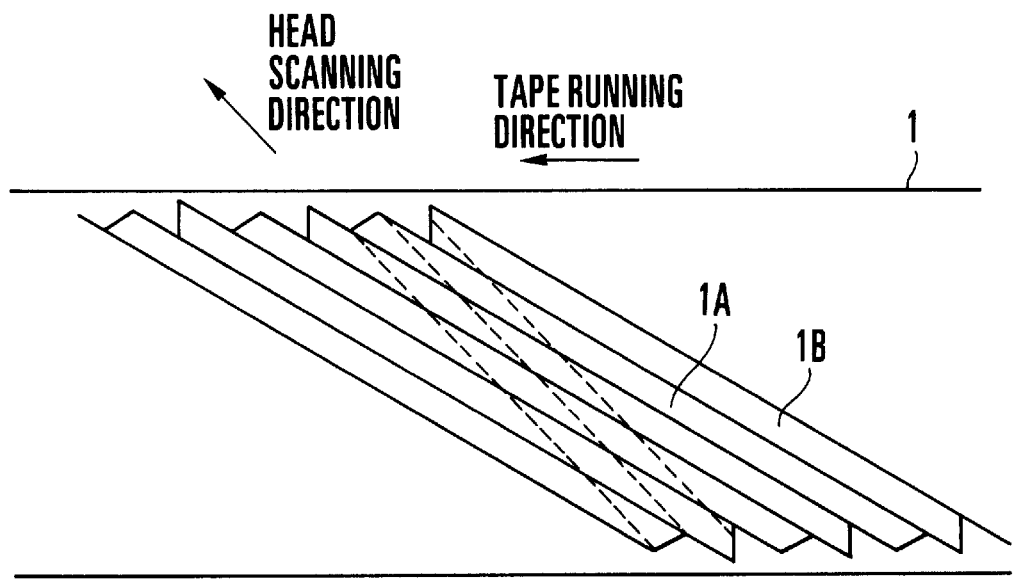
FIG. 4 is a schematic view showing the relationship between tracks and heads during search reproduction in the first embodiment of the present invention.

In the case of positive search reproduction, the magnetic heads 3a and 3b scan loci such as those shown by dashed lines in FIG. 4. In this case, since the scanning direction of each of the magnetic heads 3a and 3b and the running direction of the magnetic tape 1 are forward directions, the relative speed between the magnetic heads 3a and 3b and the magnetic tape 1 becomes smaller than that during the normal reproduction. Accordingly, the frequency of the reproduced signal becomes low.

Figure 5:
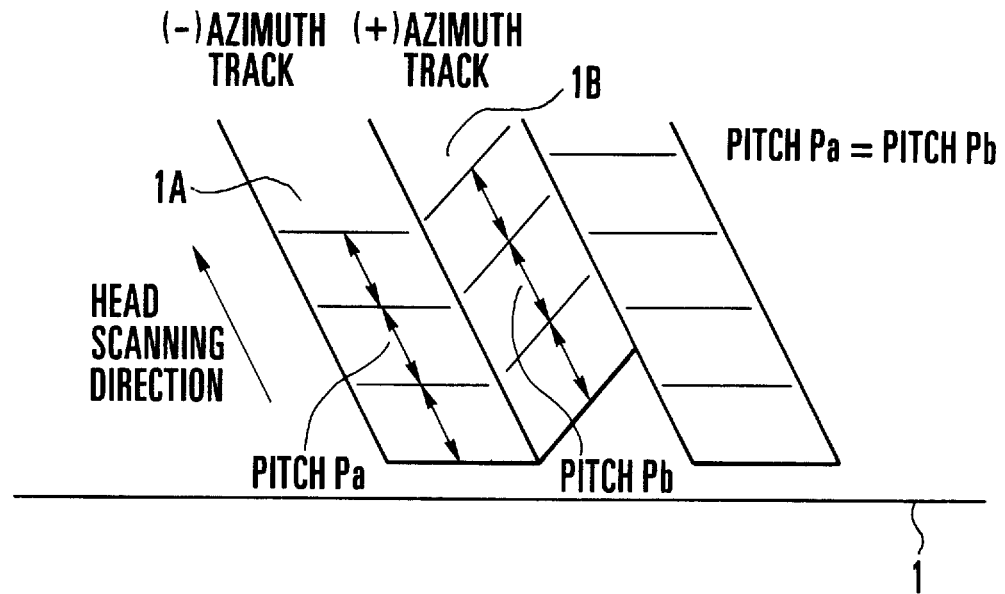
FIG. 5 is a schematic view showing the relationship between recorded data and heads during normal reproduction.
Figure 6:
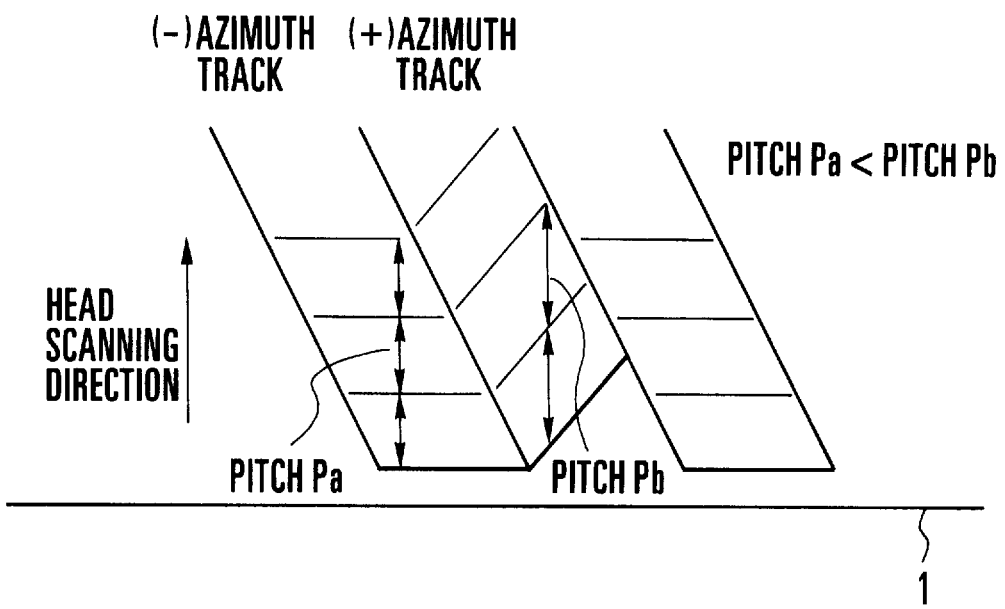
FIG. 6 is a schematic view showing the relationship between recorded data and heads during search reproduction.

FIGS. 5 and 6 show on an enlarged scale the state of the magnetic heads 3a and 3b and that of the tracks during the positive search reproduction. In FIGS. 5 and 6, the lines drawn in each of the tracks 1A and 1B represent individual bits of recorded data, and Pa and Pb denote the pitches of bit intervals in the respective tracks 1A and 1B.

As shown in FIG. 5, during the normal reproduction, the pitch Pa of the reproduction bit interval of the magnetic head a of minus azimuth is equal to the pitch Pb of the reproduction bit interval of the magnetic head 3b of plus azimuth. However, during the positive search reproduction, as shown in FIG. 6, a difference occurs between the pitch Pa and the pitch Pb to cause the phenomenon in which the frequency of a reproduced signal from the magnetic head 3a of minus azimuth becomes higher than the frequency of a reproduced signal from the magnetic head 3b of plus azimuth.

FIG. 7 shows the manner in which the frequency of a reproduced signal varies with respect to a variation in search speed when the rotational speed of a rotary drum is fixed.

As can be seen from FIG. 7, during the positive search reproduction, as the search speed increases, both the frequency of the reproduced signal of a minus-azimuth magnetic head and the frequency of the reproduced signal of a plus-azimuth magnetic head increase in such a way that the former frequency increases at a sharper angle than the latter frequency does. During negative search reproduction, an approximately opposite tendency appears.

In the following description of the first embodiment, reference will be made to a device capable of generating an optimum clock signal which follows the frequency of a reproduced signal from each magnetic head even if there is a difference between the frequencies of the reproduced signals of the respective magnetic heads due to the difference between their azimuths.

FIG. 8 is a schematic view showing the arrangement of the clock-signal generating circuit 14 shown in FIG. 2.

As shown in FIG. 8, the clock-signal generating circuit 14 includes a voltage controlled oscillator (hereinafter referred to as "S-VCO (selective VCO)") 16 capable of selecting an oscillation frequency range. The S-VCO 16 will be described later in detail. The clock-signal generating circuit 14 also includes an inverter 17 and a switch 18. The inverter 17 and the switch 18 invert the polarity of a head switching signal to be applied to the S-VCO 16, according to whether the direction of speed search (or search reproduction) is a positive (forward) or negative (backward) direction.

Figure 9:
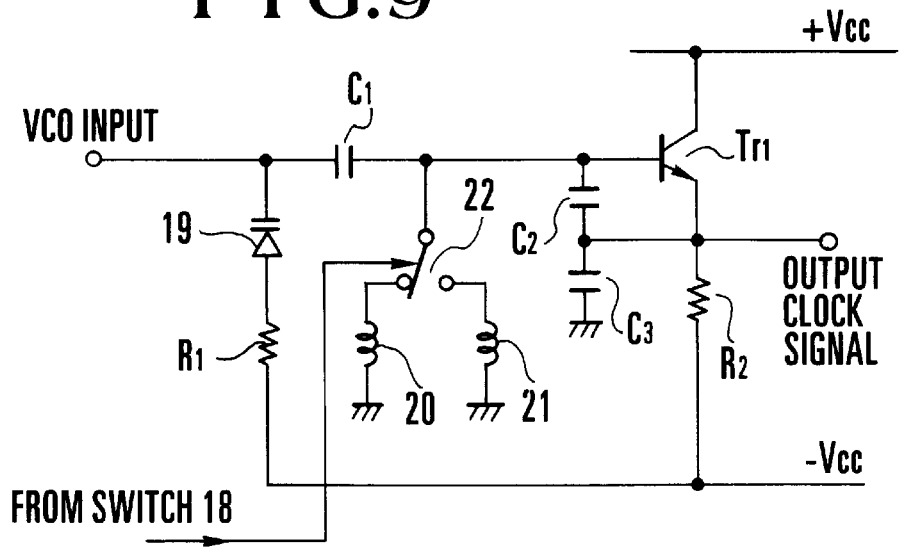
FIG. 9 is a circuit diagram showing the construction of the S-VCO shown in FIG. 8.

FIG. 9 is a circuit diagram showing a specific example of the S-VCO 16. The S-VCO 16 is formed as a circuit which is called a Colpitts oscillator. As shown, the S-VCO 16 is made up of a transistor $T_{ri}$, a variable-capacitance diode 19, capacitors $C_1$, $C_2$ and $C_3$, inductances 20 and 21, a switch 22 and resistances $R_1$ and $R_2$. The capacitance of the variable-capacitance diode 19 varies according to the VCO input voltage inputted from a loop filter 103 to the S-VCO 16, whereby the S-VCO 16 can continuously vary its oscillation frequency.

Figure 10:
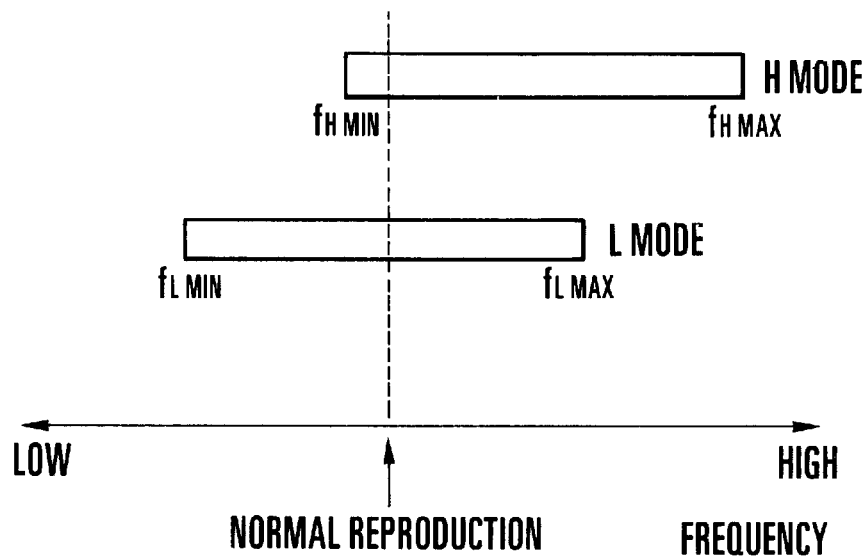
FIG. 10 is a schematic view aiding in describing the operation of the circuit shown in FIG. 8.

The inductance 20 has a value $L_1$ and the inductance 21 has a value $L_2$, and the values $L_1$ and $L_2$ are set to $L_{1406} > L_2$. The switch 22 is arranged to perform switching between the inductance 20 and the inductance 21 so that the oscillation frequency range of the S-VCO 16 can be switched as shown in FIG. 10, i.e., the S-VCO 16 can selectively operate in two modes, for example, an L mode in which the oscillation frequency range of the S-VCO 16 is centered at the frequency of the reproduced signal obtained during the normal reproduction and an H mode in which the oscillation frequency range of the S-VCO 16 at the lower limit portion thereof overlaps the frequency of the reproduced signal obtained during the normal reproduction.

Figure 11:
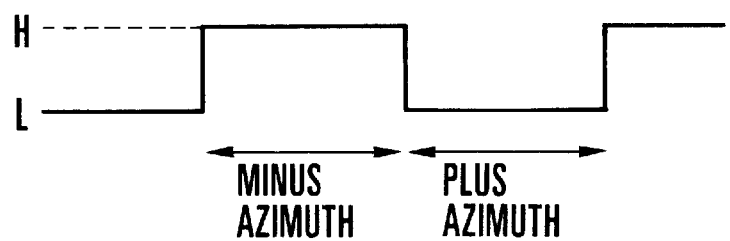
FIG. 11 is a schematic view aiding in describing the operation of the circuit shown in FIG. 8.

The operation of the S-VCO 16 will be described below. First of all, the operation of the S-VCO 16 to be performed when a positive speed search is selected will be described below. As described previously in connection with FIG. 7, it is expected that the frequency of the reproduced signal from the minus-azimuth magnetic head becomes higher than that of the reproduced signal from the plus-azimuth magnetic head. Accordingly, the switch 18 shown in FIG. 8 is connected to a side "a" according to a control signal from a system controller (not shown), and a signal, which is held at its high level during the trace period of the minus-azimuth magnetic head as shown in FIG. 11, is supplied to the S-VCO 16.

Specifically, in the first embodiment, during the trace period of the minus-azimuth magnetic head which shows the higher reproduced-signal frequency, the H mode is selected to output a high-frequency clock signal. During the trace period of the plus-azimuth magnetic head, the L mode is selected to output a low-frequency clock signal. Accordingly, the S-VCO 16 can generate clock signals for both magnetic heads within the oscillation frequency range in synchronism with reproduced data.

In the case of a backward speed search, the switch 18 is connected to the opposite side so that the L mode is selected during the trace period of the minus-azimuth magnetic head, while the H mode is selected during the trace period of the plus-azimuth magnetic head, whereby an operation similar to the above-described one can be effected.

Although the first embodiment has been described above with reference to the S-VCO 16 shown in FIG. 8 by way of example, it is also possible to adopt an arrangement such as that shown in FIG. 12. In the arrangement shown in FIG. 12, two VCOs 16a and 16b having different oscillating frequency ranges are provided, and their output clock signals are selectively outputted through a switch 23.

Otherwise, a PLL circuit of the type shown in FIG. 13 may be formed. In the PLL circuit, a VCO 24 provides an original oscillation frequency which is n times the frequency of the required clock signal, then the original oscillation frequency is frequency-divided by a frequency divider 25 the frequency division ratio of which is controlled by the output of the switch 18, and then the output of the frequency divider 25 is applied to a phase comparator 102. In the PLL circuit, the frequency division ratio may also be set to n−1so that the oscillation frequency range can be set higher. In either of the arrangements shown in FIGS. 12 and 13, it is possible to achieve an operation similar to the above-described one of the first embodiment.

In the above-described arrangement according to the first embodiment, the oscillation frequency ranges of the S-VCO 16 for the respective L and H modes are selected as shown in FIG. 10, and when the speed search is selected, the operation of performing switching between the L and H modes is started at the same time. However, as shown in FIG. 14, the range of overlap between the L and H modes of the S-VCO 16 may be reduced. In the example shown in FIG. 14, even if the speed search is selected, one VCO is made to operate until the search speed approximately reaches a medium level, and when the search speed becomes close to a level at which the difference between the frequencies of the reproduced signals from two magnetic heads exceeds the oscillation frequency range of the one VCO, the operation of performing switching between the L and H modes is started. According to the arrangement shown in FIG. 14, it is possible to achieve an operation having a far wider variable speed range.

A second embodiment of the present invention will be described below.

Figure 15:
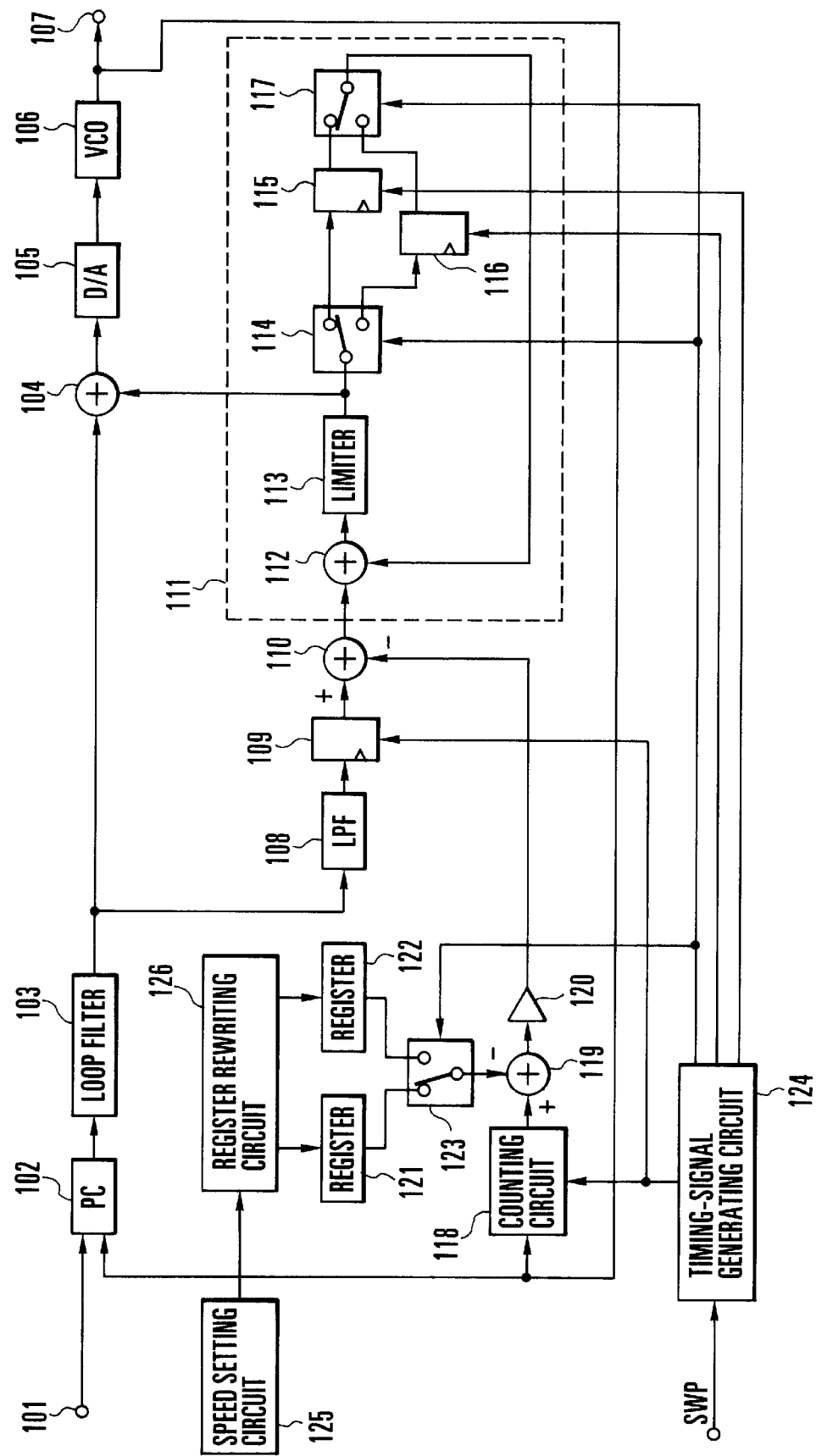
FIG. 15 is a block diagram showing another construction of the clock-signal generating circuit of FIG. 2 according to a second embodiment of the present invention.

FIG. 15 is a block diagram showing another example of the arrangement of the clock-signal generating circuit 14 shown in FIG. 2.

The clock-signal generating circuit 14 shown in FIG. 15 is provided with a PLL loop similar to that used in the above-described first embodiment. In the PLL loop, the phase error between a VCO 106 and a reproduced signal inputted through an input terminal 101 is inputted to a loop filter 103, and the input phase error is averaged so that a signal having a voltage capable of cancelling the phase error between the VCO 106 and the reproduced signal is inputted to the VCO 106.

Figure 1:
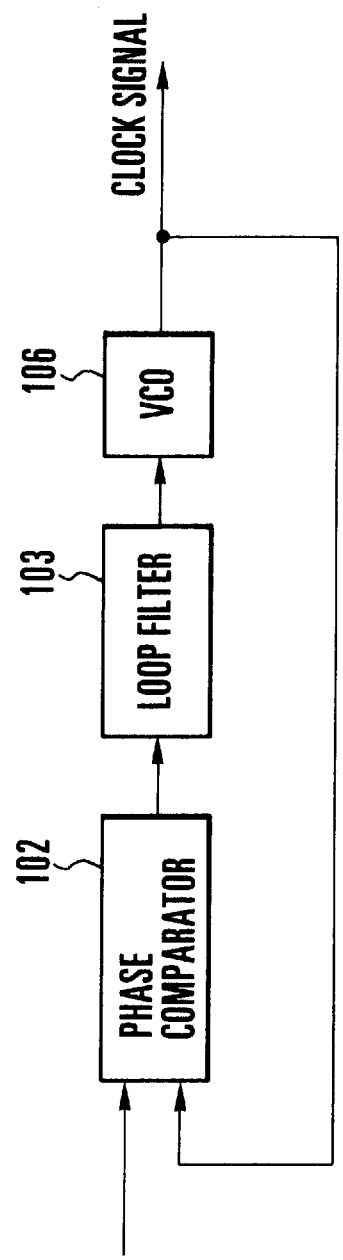
FIG. 1 is a block diagram showing the construction of a conventional PLL circuit.

Meanwhile, the PLL circuit shown in FIG. 1 is composed of analog circuits only and an input signal thereto is also an analog signal.

On the other hand, in the second embodiment, a digital signal from the A/D converter 6 shown in FIG. 2 is inputted to the clock-signal generating circuit 14. The phase comparator 102, which is composed of digital circuits, detects a phase difference between the reproduced digital signal from the A/D converter 6 and the clock signal from the VCO 106 and outputs the phase difference as a multi-valued digital signal.

The feature of the second embodiment will be described below.

The output of the VCO 106 which is oscillated in the above-described manner is inputted to a counting circuit 118. The counting circuit 118 counts the number of clock pulses which are outputted from the VCO 106 within a certain time period, for example, a time period which corresponds to the period required for the aforesaid rotary head to trace one track (this time period is hereinafter referred to as "Ttr", and Ttr in this embodiment is 1/300 second and is shown in FIG. 16(a). The counting circuit 118 outputs the result to a positive input terminal of a digital subtracter 119. The output of a register 121 or 122 is supplied to a negative input terminal of the digital subtracter 119 via a switch 123.

The registers 121 and 122 serve as a register for plus azimuth and a register for minus azimuth, respectively. The outputs of the registers 121 and 122 are selectively outputted to the digital subtracter 119 via the switch 123 which is switched according to which of the magnetic heads a and b is reproducing a signal.

A timing-signal generating circuit 124 receives the head switching signal SWP outputted from the head-switchingsignal generating circuit 15 shown in FIG. 2, and generates the timing signals shown in FIGS. 16(b) to 16(e). Incidentally, FIG. 16(a) is a view showing the envelope of a reproduced signal.

The counting circuit 118 is reset at the timing shown in FIG. 16(b), and counts the number of clock pulses during the time period during which one track is traced.

The switch 123 is switched according to the signal shown in FIG. 16(c). Specifically, the switch 123 is connected to the side of the register 121 when the signal of FIG. 16(c) is at its high level, and when the signal of FIG. 16(c) is at its low level, the switch 123 is connected to the side of the register 122.

During the normal reproduction, a signal to that effect is outputted from a speed setting circuit 125 to a register rewriting circuit 126. The register rewriting circuit 126 writes a value given by "fcent×Ttr" into each of the registers 121 and 122 during the normal reproduction, where "fcent" is the center frequency of a clock signal extracted from a reproduced digital signal which contains jitter. Accordingly, if the VCO 106 is oscillating at the frequency "fcent", the output of the digital subtracter 119 is zero.

During special reproduction such as search reproduction (speed search) or slow reproduction, the speed setting circuit 125 outputs a signal indicative of the running speed of the magnetic tape 1 to the register rewriting circuit 126. The register rewriting circuit 126 determines values corresponding to the frequency variations shown in FIG. 7 for the respective magnetic heads 3a and 3b, according to the input tape running speed, and writes the values into the respective registers 121 and 122.

Accordingly, the difference in frequency between the reproduced signal and the generated clock signal, which difference allows for the influence of the azimuth angle of the magnetic head 3a or 3b which is performing reproduction during the search reproduction, is outputted to the digital subtracter 119.

The output of the digital subtracter 119 is level-adjusted by a coefficient unit 120, as will be described later, and the output of the coefficient unit 120 is inputted to a negative input terminal of a digital subtracter 110.

The output of the loop filter 103 is outputted to an adder 104 and a low-pass filter (hereinafter referred to as "LPF") 108. The output of the LPF 108 is supplied to a register 109, and the output of the register 109 is applied to a negative input terminal of the digital subtracter 110. The register 109 samples the output of the LPF 108 at the timing Ttr shown in FIG. 16(b).

The digital subtracter 110 subtracts the output of the coefficient unit 120 from the output of the LPF 108 and outputs the result to an integrator 111.

The integrator 111 is made up of an adder 112, a limiter 113, registers 115 and 116 and switches 114 and 117. So long as the output value of the adder 112 does not reach an upper or lower limit value, each time a clock signal is inputted to the register 115 or 116, the clock signal is added to the value inputted from the digital subtracter 110.

The registers 115 and 116 serve as a register for plus azimuth and a register for minus azimuth, respectively. The value outputted from the switch 114 is written into the registers 115 and 116 according to the respective clock signals shown in FIGS. 16(d) and 16(e).

Each of the switches 114 and 117 switches according to the signal shown in FIG. 16(c), similarly to the aforesaid switch 123. Specifically, when the signal shown in FIG. 16(c) is at the high level, the switches 114 and 117 are connected to the side of the register 115, whereas when the signal shown in FIG. 16(c) is at the low level, they are connected to the side of the register 116.

By controlling the register rewriting operation according to which of the magnetic heads 3a and 3b is reproducing a signal, each of the registers 115 and 116 performs its rewriting operation only when it is given the reproduced signal from the magnetic head 3a or 3b of the corresponding azimuth, and, during the other time period, each of the registers 115 and 116 holds its rewritten value.

The output of the integrator 111 is applied to the adder 104.

The operation of generating a clock signal in the second embodiment will be described below.

In the clock-signal generating circuit 14 shown in FIG. 15, a portion for producing the reproduced envelope shown in FIG. 16(a) constitutes the PLL in which the phase of the reproduced signal and the phase of the output clock of the VCO 106 are compared with each other by the phase comparator (PC) 102 and the comparison result is averaged by the loop filter 103 and applied to the VCO 106 via the adder 104. The oscillation output signal of the VCO 106 is outputted from an output terminal 107 as a clock signal for use in the A/D converter 6.

The following description is made in connection with a case in which the oscillation frequency of the VCO 106 tends to lower by any external cause when the PLL formed by the phase comparator 102, the loop filter 103 and the VCO 106 is phase-locked during the time period Ttr in which the reproduced envelope is obtained. In this case, since a phase difference occurs between the input signals of the phase comparator 102 during the time period Ttr in which the reproduced envelope is obtained, the output digital value of the phase comparator 102 decreases and the output digital value of the loop filter 103 increases. Then, control is performed so that the output clock signal of the VCO 106 and the reproduced clock signal can be placed in correct phase with each other.

In this manner, the phase error between the output clock signal of the VCO 106 and the output clock signal of the VCO 106 due to the error of the oscillation frequency of the VCO 106 is corrected. However, in this corrected state, the output digital value of the loop filter 103 has already increased and the output digital value has deviated from the center of the lock range of the PLL. Accordingly, if the phase error between the reproduced clock signal and the output clock signal of the VCO 106 is to be further corrected, the lock of the PLL will become unable to follow phase variations.

To solve this problem, the second embodiment is arranged to detect the phase error with a time constant which is long compared to the PLL, through the path of the LPF 108→ →the integrator 111→ the adder 104, thereby detecting the tendency of the output voltage of the loop filter 103 and adding the detected tendency to the output voltage of the loop filter 103. Thus, the deviation of the output digital value of the loop filter 103 is compensated for by using the output of the integrator 111, whereby the output digital value of the loop filter 103 is held in the center of the lock range of the PLL at all times. This operation of the second embodiment will be described below.

The LPF 108 serves to average for one track the output of the loop filter 103 relative to an individual track and to supply the averaged output to the register 109. The register 109 receives the output of the LPF 108 at the timing of Ttr, i.e., at the timing of the end of each track, as shown in FIG. 16. Therefore, the output of the register 109 increases according as the output digital value of the loop filter 103 increases, as described above, owing to the phase error between the output clock signal of the VCO 106 and the reproduced clock signal.

Therefore, the value of each of the registers 115 and 116 within the integrator 111 varies in the positive direction, so that the output from the integrator 111 to the adder 104 increases. Since the output of the integrator 111 is equal to the error signal outputted from the loop filter 103 during the time period Ttr, the output of the integrator 111 can be substituted for the error signal outputted from the loop filter 103. Accordingly, since control is performed not in accordance with an increase in the output voltage of the loop filter 103 but by using the output of the integrator 111, it is possible to hold the output voltage of the loop filter 103 in the center of the lock range of the PLL at all times.

As the output of the adder 104 increases, the oscillation frequency of the VCO 106 becomes higher as described above. When the phase difference between the reproduced clock signal and the output clock signal of the VCO 106 is cancelled, the variation in the output of each of the registers 115 and 116 disappears. In the meantime, since the oscillation frequency of the VCO 106 does not vary, no error signal is outputted from the digital subtracter 119, so that the output of the register 109 is outputted from the digital subtracter 110 without modification.

The reason why the operating clock signal of each of the counting circuit 118 and the register 109 is set to Ttr in time, i.e., 300 Hz in frequency, is to add the output of the integrator 111 to the output from the loop filter 103 to the adder 104 during the time period in which no reproduced envelope is obtained, thereby preventing disturbance of the PLL due to an instantaneous variation in the input voltage of the VCO 106 during the time period in which the reproduced signal is obtained, by adding the output of the integrator 111 to the output from the loop filter 103 to the adder 104 during the time period in which no reproduced envelope is obtained. Also, in a case where the reproduced envelope is obtained at all times, if the clocksignal generating circuit 14 is made to operate when a signal other than an effective signal (for example, an image signal or a sound signal) is being reproduced, it is possible to minimize the disturbance of an image or sound due to frequency variations.

Frequency control using the counting circuit 118 and the registers 121 and 122 will be described below. This system to be described below is used so that, if the frequency of a signal reproduced from the magn etic tape 1 varies due to s earch reproduction or other special reproduction as described previously, the center frequency of the VCO 106 can be made to vary by varying the values of the registers 121 and 122.

In the clock-s ignal generating circuit 14 shown in FIG. 15, a feedback loop is formed as described previously. In the feedback loop, the counting circui t 118 counts the number of clock pulses outputted from the VCO 106 during the time period Ttr, and outputs the count value a t the timing when the timing signal for the time period Ttr is inputted. The digital subtracter 1119 subtracts from the count value the output of the register 121 or 122 which is supplied via the sw itch 123, and the output of the digital subtracter 119 is supplied to the integrator 111 via the coefficient unit 120 and the digital subtracter 110, and the output of the digital subtracter 110 is averaged by the integrator 111. The output of the integrator 111 is supplied to the adder 104, and the output of the adder 104 is supplied to the VCO 106. In other words, automatic control of the oscillation frequency of the VCO 106, i.e., an AFC operation, is performed by the above-described describe feedback loop.

In the above-described second embodiment, different values are written into the registers 121 and 122 according to the different azimuths of the two magnetic heads 3a and 3b, and the different values written into the registers 121 and 122 are selectively supplied to the digital subtracter 119 at the timing when either of the magnetic heads 3a or 3b traces the magnetic tape 1, whereby the center frequency of t he VCO 106 can b e automatically controlled to become frequencies which take account of the azimuth angles according to the respective magnetic heads 3*a* and 3*b*.

The gain of the coefficient unit 120 is set to be kept equal between the output of the loop filter 103 and the input of the digital subtracter 110, so that it is possible to prevent the influence of phase or frequency variations from being exerted on the in tegrator 111.

The gain of the coefficient unit 120 is set so that the path of the loop filter 103→the adder 104→a DcA converter 105 →the VCO 106→the counting circuit 118→the digital subtracter 119 -the coefficient unit 120 can be equal to the path of the loop filter 103→the LPF 108→the register 109.

As described above, in the second embodiment, during the time period Ttr, normal phase control is performed by the PLL formed by the phase comparator 102, the loop filter 103, the adder 104 and the VCO 106, to produce a clock signal. In addition, by operating the feedback loop formed by the LPF 108, the register 109, the int egrator 111, the adder 104 and the VCO 106 at intervals of the time period Ttr, the tendency of the output of the loop filter 103 is detected to compensate for the deviation of the output voltage of the loop filter 103 (the input voltage of the VCO 106) due to a phase error occurring during the time period Ttr. Thus, it is possible to hold the output voltage of the loop filter 103 in the center of the lock range of the PLL at all times. Accordingly, it is possible to prevent the lock of the PLL from readily becoming unable to follow a variation in the oscillation frequency of the VCO 106.

In addition, the counting circuit 118 counts the number of clock pulses outputted from the VCO 106, and the output of the register 121 or 122 is subtracted from the count value to detect the error of the oscillation frequency of the VCO 106 which occurs during the time period Ttr. The digital subtracter 110 subtracts the detected error from the output of the loop filter 103, and the output of the digital subtracter 110 is integrated to obtain an average value of the frequency error, and the oscillation frequency of the VCO 106 is controlled on the basis of the average value. Accordingly, it is possible to prevent the oscillation frequency of the VCO 106 from varying due to temperature variations or aging.

In addition, as described above, the registers for setting target oscillation frequencies and the registers for integration are provided for the different azimuths of the respective magnetic heads, and the values of the respective registers are selectively outputted at the timing when either of the magnetic heads traces the magnetic tape. Accordingly, the frequency of a reproduced clock signal is prevented from deviating from the lock range of the PLL owing to the difference between the azimuth angles during search reproduction or other special reproduction. It is, therefore, possible to generate an optimum clock signal corresponding to the difference between the frequencies of the reproduced signal from the magnetic heads.

Although in the second embodiment the output voltage of the loop filter 103 is averaged by the LPF 108 and the result provided by the digital subtracter 110 is integrated by the integrator 111 to detect the tendency of the output of the loop filter 103, it is also possible to detect such tendency, as by counting the most significant bit (MSB) of the output data of the register 109 by means of an up-down counter. Another method can also be employed. Although two magnetic heads having different azimuths are used to reproduce a signal, three or more magnetic heads having different azimuths may also be employed.

A third embodiment of the present invention will be described below in which a microcomputer executes in accordance with a program the above-described operation performed with a clock signal of Ttr in the circuit shown in FIG. 15.

FIG. 17 is a block diagram showing the arrangement of a clock-signal generating circuit according to a third embodiment of the present invention.

In the clock-signal generating circuit shown in FIG. 17, the output of the LPF 108 is applied to an input port of a microcomputer 202, and the output of the VCO 106 is frequency-divided by a pre-scaler 201 and applied to a built-in counter incorporated in the microcomputer 202. Although this counter may be externally attached, the use of the built-in counter can reduce the required number of constituent components.

Figure 18:
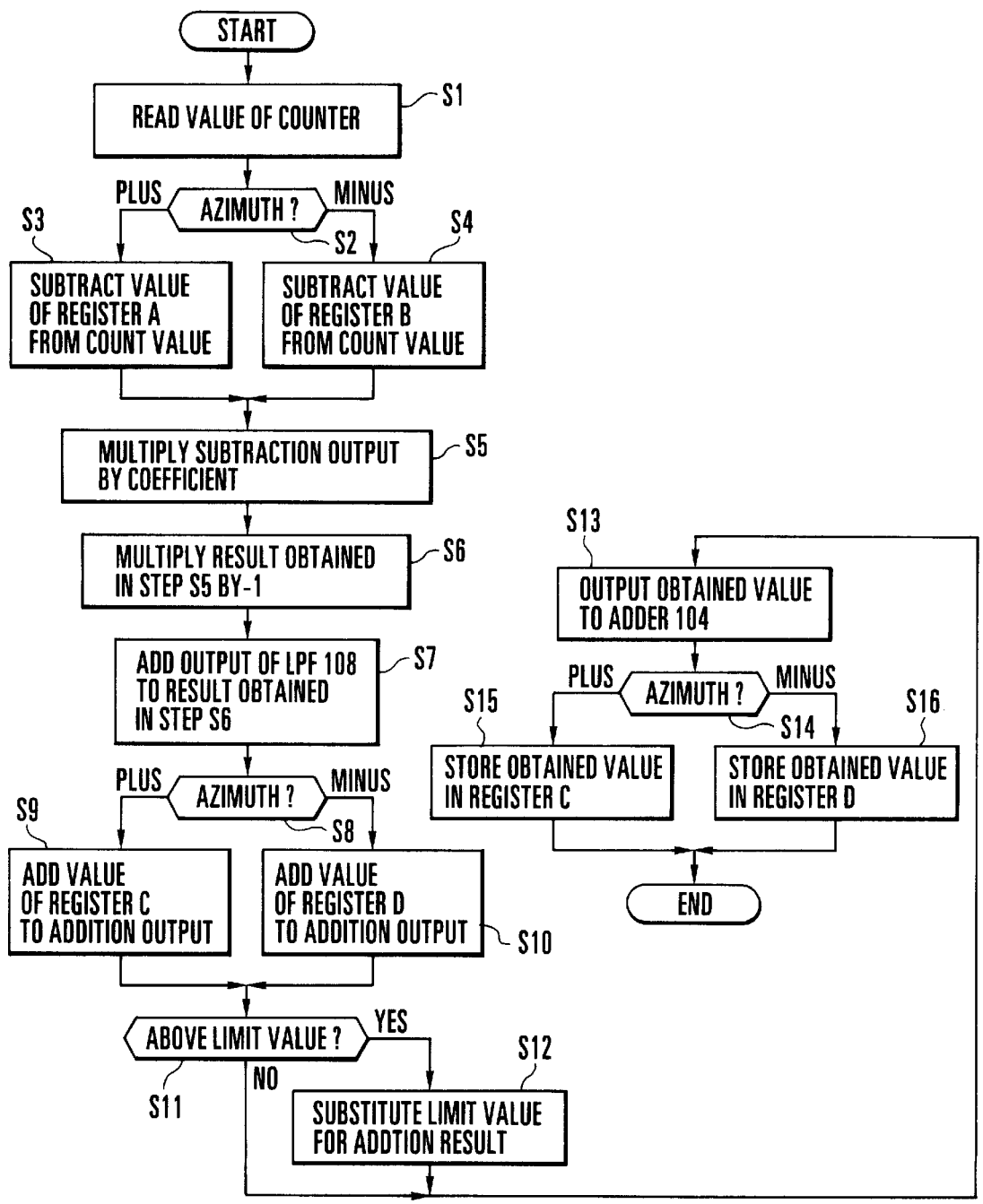
FIG. 18 is a flowchart aiding in describing the operation of the circuit shown in FIG. 17.

The operation of the microcomputer 202 will be described below with reference to the flowchart of FIG. 18. Incidentally, it is assumed that the registers A and B shown in FIG. 18 have functions similar to those of the respective registers 121 and 122 shown in FIG. 15, while the registers C and D shown in FIG. 18 have functions similar to those of the respective registers 115 and 116.

First of all, if a signal Ttr is inputted from the timing-signal generating circuit 124 at the timing of a break in an envelope, the operation of the microcomputer 202 starts with the input of this signal Ttr. If the signal Ttr is inputted, the microcomputer 202 reads the value of the counter (Step S1) and determines from the signal SWP supplied from the timing-signal generating circuit 124 whether the azimuth of a magnetic head which is currently reproducing a signal is plus or minus (Step S2). If the azimuth of the magnetic head is plus, i.e., the magnetic head is the magnetic head 3*b*, the value of the register A is subtracted from the count value (Step S3). If the azimuth of the magnetic head is minus, i.e., the magnetic head is the magnetic head 3*a*, the value of the register B is subtracted from the count value (Step S4). Then, the result obtained in Step S3 or S4 is multiplied by a coefficient corresponding to the coefficient unit 120 shown in FIG. 15 (Step S5). After the result obtained in Step S5 is multiplied by–1 (Step S6), the output of the LPF 108 outputted from the register 109 at the timing of the signal Ttr is added to the result obtained in Step S6 (Step S7).

In a manner similar to that used in Step S2, the azimuth of the magnetic head is confirmed (Step S8). In the case of the plus azimuth, the value obtained in Step S7 is added to the value of the register C (Step S6). In the case of the minus azimuth, the value obtained in Step S7 is added to the value of the register D (Step S10).

Then, it is determined whether the addition result exceeds a limit value (Step S11). If the addition result exceeds the limit value, the limit value is substituted for the addition result, and is stored in each of the registers C and D and is also outputted to the adder 104 (Steps S12, S13, S14, S15 and S16).

If the addition result does not exceed the limit value, the value of the addition result is stored in each of the registers C and D and is also outputted to the adder 104 (Steps S12, S13, S14, S15 and S16).

According to the third embodiment described above, since the microcomputer performs a compensation for the deviation of the output voltage of the loop filter 103 due to a phase error occurring during the time period Ttr, the required number of constituent components can be reduced to a further extent.

The above-described operation of compensating for the deviation of the input voltage of the VCO 106 due to a phase error occurring the time period Ttr is performed at an operating speed as slow as 300 Hz. Accordingly, if an arrangement is adopted in which such operation is performed during an idle time period of another operation of the microcomputer, it is not necessary to substantially increase the required number of constituent components.

In the reproducing system of the digital VTR shown in FIG. 2, after A/D conversion has been performed, processing using PR (1, 0, −1) techniques are performed. However, it is also possible to adopt another arrangement in which, for example, after the reproduction of a signal, the signal is subjected to equalization and the processing using PR (1, 0, −1) techniques in the reproduction equalizing circuit.

In the above description of each of the embodiments, reference has been made to the apparatus in which two magnetic heads each having a different azimuth, which are disposed on a rotary drum with a phase difference of 180°, alternately trace magnetic tape to reproduce a signal. However, digital VTRs of different types having different arrangements and constructions are known. In some types of digital VTRs, two magnetic heads each having a different azimuth angle are disposed close to each other so as to simultaneously trace magnetic tape to reproduce or perform a signal.

A fourth embodiment in which the present invention is applied to such digital VTR will be described below.

Figure 19:
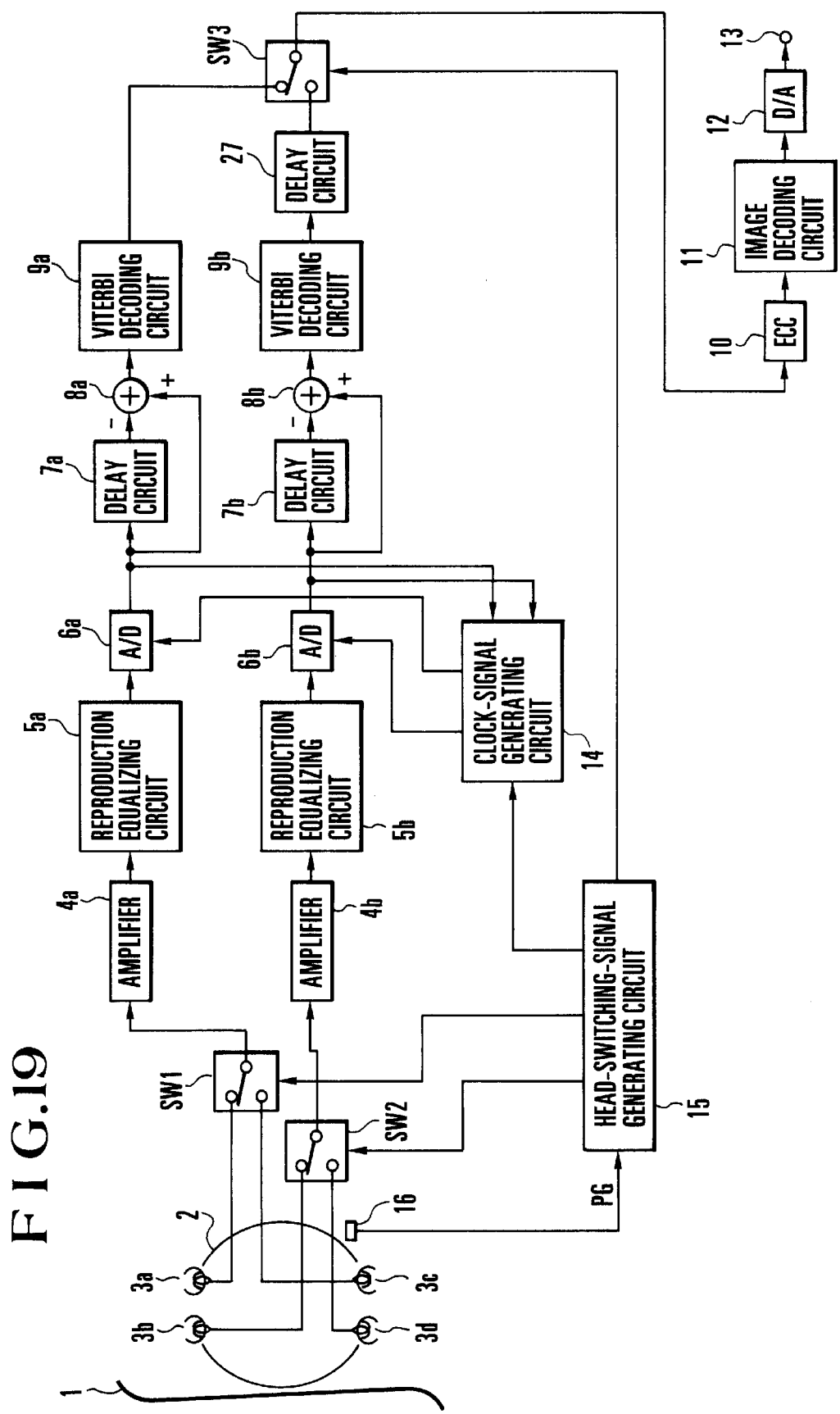
FIG. 19 is a block diagram showing the construction of a digital VTR according to a fourth embodiment of the present invention.

FIG. 19 is a block diagram showing the arrangement of the fourth embodiment of the present invention. In FIG. 19, identical reference numerals are used to denote constituent elements identical to those shown in FIG. 2.

Referring to FIG. 19, the rotary drum 2 is provided with the magnetic heads 3a and 3b each having a different azimuth angle as well as magnetic heads 3c and 3d each having a different azimuth angle. The magnetic heads 3a and 3b are disposed close to each other, while the magnetic heads 3c and 3d are disposed close to each other. The magnetic heads 3a and 3c are disposed with a phase difference of 180°, while the magnetic heads 3b and 3d are disposed with a phase difference of 180°. The magnetic heads 3a and 3c have the same azimuth angle, while the magnetic heads 3b and 3d have the same azimuth angle.

The signals reproduced from the magnetic heads 3a and 3c are sequentially supplied to an amplifier 4a via a switch SW1. After the input signal has been amplified by the amplifier 4a, the output signal of the amplifier 4a is subjected to equalization in a reproduction equalizing circuit 5a. Then, the equalized signal is converted into a digital signal consisting of a plurality of bits per sample by an A/D converter 6a by using a clock signal supplied from the clock-signal generating circuit 14. The digital signal is supplied to the clock-signal generating circuit 14, a delay circuit 7a and a subtracter 8a.

In the meantime, the signals reproduced from the magnetic heads 3b and 3d are sequentially supplied to an amplifier 4b via a switch SW2. After the input signal has been amplified by the amplifier 4b, the output signal of the amplifier 4b is subjected to equalization in a reproduction equalizing circuit 5b. Then, the equalized signal is converted into a digital signal consisting of a plurality of bits per sample by an A/D converter 6b by using a clock signal supplied from the clock-signal generating circuit 14. The digital signal is supplied to the clock-signal generating circuit 14, a delay circuit 7b and a subtracter 8b.

The system formed by the amplifier 4a, the reproduction equalizing circuit 5a , the A/D converter 6a , the delay circuit 7a and the subtracter 8a and the system formed by the amplifier 4b , the reproduction equalizing circuit 5b, the A/D converter 6b, the delay circuit 7b and the subtracter 8b are respectively arranged to process the signals reproduced from the magnetic heads 3a and 3c and the signals reproduced from the magnetic heads 3b and 3d, the magnetic heads 3a and 3c having azimuth angles different from those of the magnetic heads 3b and 3d. Both systems can be designed to have optimum equalization characteristics and signal processing characteristics which correspond to the magnetic heads 3a , 3c and the magnetic heads 3b , 3d, respectively.

The signals having PR (1, 0, −1) characteristics are outputted from the subtracters 8a and 8b to Viterbi decoding circuits 9a and 9b respectively. The viterbi decoding circuits 9a and 9b respectively decode the input signals into signals each represented by "1" and"0", i.e., signals each consisting of 1 bit per sample.

The output of the Viterbi decoding circuit 9b is delayed by a time period equivalent to the time period required to reproduce a signal for one track, by a delay circuit 27. The thus-delayed signal is outputted to a switch SW3.

The switch SW3 performs switching according to the signal SWP outputted from the head-switching-signal generating circuit 15, and selectively outputs to the ECC circuit 10 the output signal from the Viterbi decoding circuit 9a and the output signal from the delay circuit 27.

The other operation is similar to that of each of the above-described embodiments.

The clock-signal generating circuit 14 shown in FIG. 19 will be described below.

In the fourth embodiment, two clock-signal generating circuits each of which is similar to that shown in FIG. 15 are disposed for the plus- and minus-azimuth magnetic heads so that one of the clock-signal generating circuits can generate a clock signal synchronized with the plus-azimuth magnetic heads and the other can generate a clock signal synchronized with the minus-azimuth magnetic heads.

Figure 20:
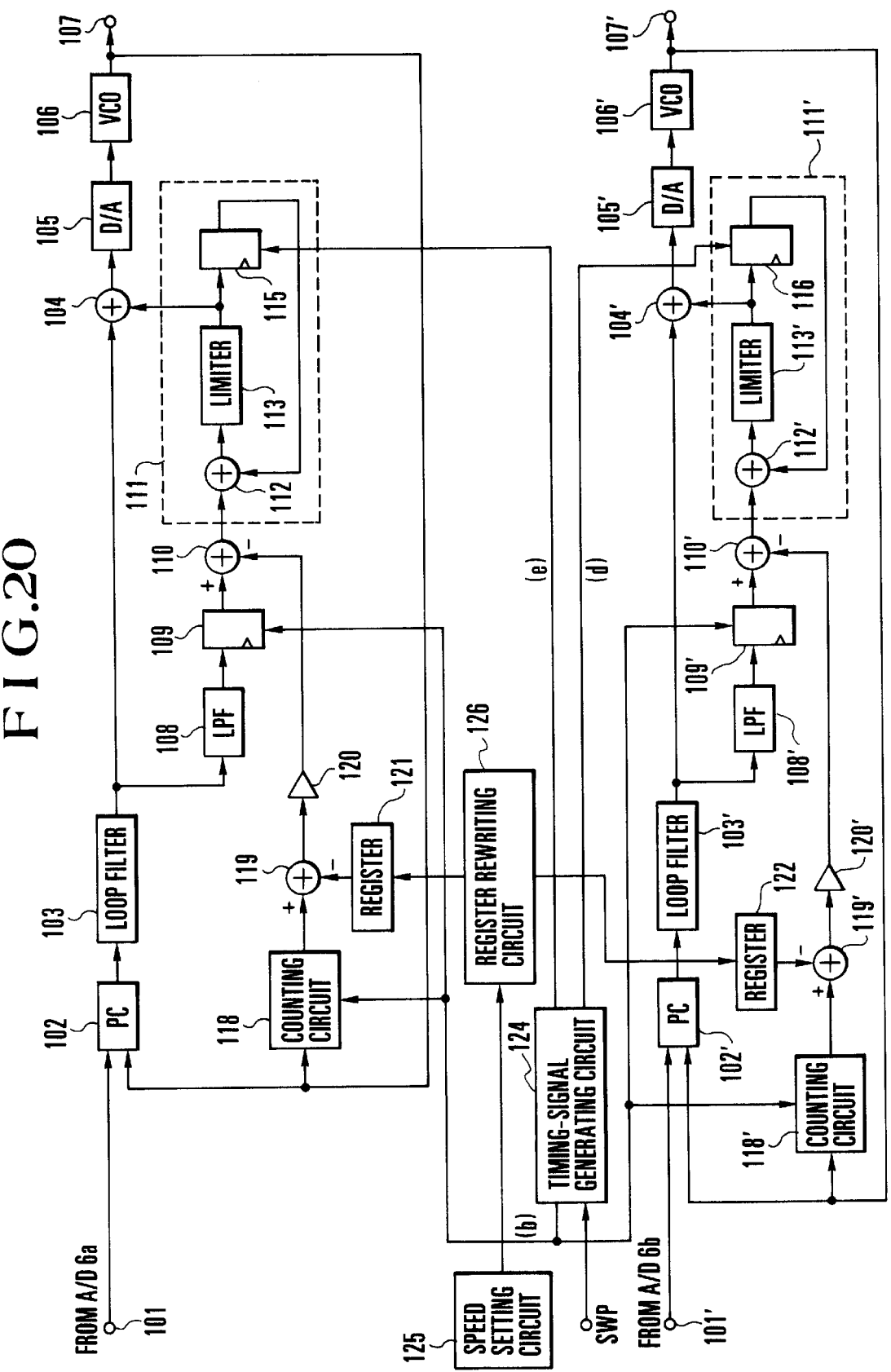
FIG. 20 is a block diagram showing the construction of the clock-signal generating circuit shown in FIG. 19.

Specifically, the entire operation of each of the systems shown in FIG. 20 is substantially identical to that described previously in connection with FIG. 15. Referring to FIG. 20, the signal outputted from the A/D converter 6a is inputted through the input terminal 101, and a clock which is phase-synchronized with the reproduced signal from each of the minus-azimuth magnetic heads is outputted from the output terminal 107. The signal outputted from the A/D converter 6b is inputted through an input terminal 101', and a clock which is phase-synchronized with the reproduced signal from each the plus-azimuth magnetic heads is outputted from an output terminal 107'.

In the clock-signal generating circuit 14 shown in FIG. 20, the registers 121 and 122 are respectively provided in the respective systems, and the registers 115 and 116 are respectively provided in the respective systems.

In the clock-signal generating circuit 14 shown in FIG. 20, as shown in FIG. 7, the register rewriting circuit 126 rewrites into the register 121 a value corresponding to a variation in the frequency of the reproduced signal from either of the minus-azimuth magnetic heads, and into the register 122 a value corresponding to a variation in the frequency of the reproduced signal from either of the minusazimuth magnetic heads.

At this time, the timing-signal generating circuit 124 outputs the signal shown in FIG. 16(e) to the register 115 and, at this timing, the output signal of a limiter 113 is written into the register 115. The timing-signal generating circuit 124 outputs the signal shown in FIG. 16(d) to the register 116 and, at this timing, the output signal of a limiter 113'is written into the register 116.

As described above, the fourth embodiment includes a plurality of clock-signal generating circuit systems, one for magnetic heads of plus azimuth and the other for magnetic heads of minus azimuth, and each of the clock-signal generating circuit systems is provided with a register for setting a target oscillation frequency and a register for integration. Accordingly, even in an arrangement in which a plurality of magnetic heads having different azimuths simultaneously trace magnetic tape to reproduce a signal, the frequency of a reproduced clock signal is prevented from deviating from the lock range of the PLL owing to the difference between the azimuth angles during search reproduction or other special reproduction. It is, therefore, possible to generate optimum clock signals corresponding to the differences between the frequencies of the reproduced signals from the plurality of magnetic heads.

Although the above-described embodiments use a digital or analog phase comparator for detecting the phase error between a reproduced signal and the output of a VCO, it is possible to adopt any other means for detecting the phase error between a reproduced signal and the output of a VCO.

Although in the above description of each of the embodiments reference has been made to the case in which the present invention is applied to a digital VTR, the present invention is not limited to such a case. The present invention can be applied to systems for transmission, recording and reproduction of digital signals, such as optical disks or communication systems using radio waves or light. In any case, it is possible to achieve similar effects and advantages.

As is apparent from the foregoing description, in each of the above-described embodiments, a clock-signal generating operation is controlled by employing the result obtained by making a comparison between the count value of a clock signal and the value of reference data, and the value of the reference data is set according to the azimuth angle of each individual magnetic head. Accordingly, the frequency of a reproduced clock signal is prevented from deviating from the lock range of the PLL owing to the difference between the azimuth angles during search reproduction or other special reproduction. It is, therefore, possible to generate an optimum clock signal corresponding to the difference between the frequencies of the reproduced signals from the magnetic heads.

In addition, a detection output from the PLL, which indicates a detected clock frequency error, and the output of a loop filter are integrated, and the obtained integration output and the output of the loop filter are added together and the addition result is inputted to voltage controlled oscillation means. In addition, the operation of detecting a frequency error is varied according to the azimuth angle of each magnetic head. Accordingly, it is possible to stably hold the oscillation frequency of the voltage controlled oscillation means without being influenced by temperature variations or aging.

In addition, it is possible to hold the loop of the PLL in the center of the lock range thereof at all times, and it is possible to generate clock signals having frequencies corresponding to the reproduced signals from the respective magnetic heads, irrespective of the difference between the azimuth angles thereof.

The fourth embodiment of the present invention is provided with a plurality of generating means for generating clock signals having frequencies and phase-synchronized with a plurality of magnetic heads. Accordingly, even in an arrangement in which the plurality of magnetic heads simultaneously reproduce signals from a recording medium, it is possible to generate optimum clock signals corresponding to the processing of the reproduced signals from the respective magnetic heads.

As is apparent from the foregoing description, in any of the embodiments of the present invention, it is possible to reproduce a good signal from each of the magnetic heads.

What is claimed is:

1. A reproducing apparatus comprising:
   (a) reproducing means for reproducing a signal from a recording medium by using a plurality of heads each having a different azimuth angle;
   (b) generating means for generating a clock signal phase-synchronized with the reproduced signal; and
   (c) controlling means for controlling a clock-signal generating operation of said generating means according to i e azimuth angle of each of the plurality of heads.

2. An apparatus according to claim 1, wherein said generating means includes phase-difference detecting means for detecting a phase difference between the reproduced signal and the clock signal, a loop filter for receiving an output of said phase-difference detecting means, and a plurality of oscillation means, each having a different oscillation frequency range, for generating as the clock signal a signal having a frequency corresponding to an output of said loop filter, said controlling means selectively supplying the output of said loop filter to said plurality of oscillation means according to the azimuth angle of each of the plurality of heads.

3. An apparatus according to claim 1, wherein said generating means includes phase-difference detecting means for detecting a phase difference between the reproduced signal and the clock signal, a loop filter for receiving an output of said phase-difference detecting means, oscillation means for outputting a signal having a frequency corresponding to an output of said loop filter, and frequency dividing means for frequency-dividing an output signal of said oscillation means, said controlling means varying a frequency-division ratio of said frequency dividing means according to the azimuth angle of each of the plurality of heads.

4. An apparatus according to claim 1, wherein said generating means includes phase-difference detecting means for detecting a phase difference between the reproduced signal and the clock signal, a loop filter for receiving an output of said phase-difference detecting means, and oscillation means for outputting as the clock signal a signal having a frequency corresponding to an output of said loop filter, said controlling means varying an oscillation center frequency of said oscillation means according to the azimuth angle of each of the plurality of heads.

5. An apparatus according to claim 4, wherein said controlling means varies the oscillation center frequency of said oscillation means according to a transport speed of the recording medium.

6. An apparatus according to claim 1, wherein said controlling means varies a frequency of the clock signal according to the azimuth angle of each of the plurality of heads.

7. An apparatus according to claim 1, wherein said controlling means includes counting means for counting the clock signal generated by said generating means, comparing means for comparing a count value of said counting means with a value of reference data which is data for converting a frequency of the clock signal into a desired frequency, and setting means for setting the value of the reference data according to the azimuth angle of each of the plurality of heads, said controlling means varying the frequency of the clock signal by using an output of said comparing means.

8. A reproducing apparatus comprising:
(a) reproducing means for reproducing a signal from a recording medium by using a plurality of heads each having a different azimuth angle;
(b) generating means for generating a clock signal phase-synchronized with the reproduced signal; and
(c) controlling means for detecting a frequency of the clock signal and controlling a clock-signal generating operation of said generating means by using the detected result,
said controlling means varying the frequency of the clock signal according to the azimuth angle of each of the plurality of heads.

9. An apparatus according to claim 8, wherein said controlling means includes detecting means for detecting a tendency of the detected result, and controls the frequency of the clock signal according to an output of said detecting means.

10. An apparatus according to claim 8, wherein said controlling means includes a counter for counting the clock generated by said generating means during a predetermined time period, a register for holding a comparative value, and comparing means for comparing the comparative value with a count value of said counter, said controlling means setting the comparative value according to the azimuth angle of each of the plurality of heads.

11. An apparatus according to claim 10, wherein said generating means phase-difference detecting means for detecting a phase difference between the clock signal and the reproduced signal, a loop filter for receiving an output of said phase-difference detecting means, and oscillation means for outputting as the clock signal a signal having a frequency corresponding to an output of said loop filter.

12. An apparatus according to claim 11, wherein said controlling means further includes first adding means for adding an output of said comparing means to the output of said loop filter, detecting means for detecting a tendency of an output of said first adding means and outputting a signal indicative of the tendency, and second adding means for adding the output of said loop filter to the signal outputted from said detecting means, said controlling means inputting an output of said second adding means to said generating means.

13. An apparatus according to claim 12, wherein said detecting means includes averaging means for averaging the output of said loop filter and integrating means for integrating an output of said averaging means.

14. An apparatus according to claim 13, wherein said detecting means includes a plurality of holding means each of which is provided for holding the output of said first adding means, said plurality of holding means respectively corresponding to the azimuth angles, and third adding means for adding outputs of said plurality of holding means to the output of said first adding means, said second adding means adding an output of said third adding means to the output of said loop filter.

15. An apparatus according to claim 8, wherein said controlling means varies the frequency of the clock signal according to a transport speed of the recording medium.

16. An apparatus according to claim 8, further comprising converting means for sampling the reproduced signal by using the clock signal and converting the sampled reproduced signal into a digital signal formed by a plurality of bits per sample, the produced signal being asignal the amplitude of which varies in analog form.

17. A reproducing apparatus comprising:
(a) reproducing means for reproducing signals from recording medium by using a plurality of heads including a first head and a second head; and
(b) generating means for generating clock signals phase-synchronized with the reproduced signals,
said generating means generating the clock signals of a first frequency when said reproducing means reproduces the signals by the first head and generating the clock signals of a second freguency different from the first frequency when said reproducing means reproduces the signals by the second head.

18. An apparatus according to claim 17, further comprising switching-signal generating means for generating a head switching signal for switching the plurality of heads for reproducing the signal from the recording medium, said generating means generating the clock signals having the different frequencies according to the head switching signal.

19. An apparatus according to claim 17, further including a plurality of said generating means.

20. A reproducing apparatus, comprising:
a) a plurality of transducers for picking up a digital signal from a recording medium, the plurality of transducers including a first transducer and a second transducer; and
b) a PLL circuit for generating a clock signal phase-synchronized with the digital signal,
said apparatus having a first state in which the first transducer picks up the digital signal and the PLL circuit generates the clock signal of a first frequency and a second state in which the second transducer picks up the digital signal and the PLL circuit generates the clock signal of a second frequency different from the first frequency.

21. An apparatus according to claim 20, wherein each of the plurality of transducers traces a plurality of tracks on the recording medium and picks up the digital signal from the plurality of tracks.

22. An apparatus according to claim 20, wherein said apparatus has a normal reproduction mode in which the PLL circuit generates the clock signal of a single frequency and a search reproduction mode, the first state and the second state being included in the search reproduction mode.

23. An apparatus according to claim 20, further comprising a sampling circuit for sampling the digital signal from the plurality of transducers according to the clock signal, the PLL circuit generating the clock signal by using the sampled digital signal.

24. A reproducing method which is applicable to an apparatus which is arranged to reproduce a signal from a recording medium by using a plurality of heads each having a different azimuth angle, said reproducing method generating a clock signal phase-synchronized with the reproduced signal,
said reproducing method comprising the step of:
varying a frequency of the clock signal according to the azimuth angle of each of the plurality of heads.

25. A method according to claim 24, wherein said apparatus is provided with a PLL circuit having an oscillator, a phase difference detector which detects a phase difference between a clock signal outputted from said oscillator and said reproduced signal and a loop filter which receives an output from said phase-difference detector.

26. A method according to claim 25, further comprising the steps of:
counting the clock signal; and
comparing the result of the counting with a comparing value, said varying step varies the frequency of the clock signal by controlling said oscillator on the basis of a compared result obtained by the comparing step of comparing the result of the counting with the comparing value.

27. A method according to claim 26, wherein the counting step and the comparing step are carried out by means of a microcomputer.

28. A reproducing method which is applicable to an apparatus which is arranged to reproduce a signal from a recording medium by using a plurality of heads including a first head and a second head, said reproducing method generating a clock signal phase-synchronized with the reproduced signal, said reproducing method comprising the steps of:
generating the clock signals of a first frequency when said reproducing means reproduces the signals by the first head; and
generating the clock signals of a second frequency different from the first frequency when said reproducing means reproduces the signals by the second head.

29. A reproducing apparatus, comprising: p1 reproducing means for reproducing a signal from a recording medium by using a plurality of transducers each having a different azimuth angle;

generation means for generating a clock signal phase-synchronized with the reproduced signal;
sampling means for sampling the reproduced signal by using the clock signal and obtaining a digital signal formed by a plurality of bits per sample; and
control means for controlling a clock-signal generating operation of said generation means,
said control means varying a frequency of the clock signal according to the azimuth angle of each of the plurality of heads.

30. An apparatus according to claim 29, wherein said control means includes detecting means for detecting a frequency of the clock signal and for detecting a tendency of the detected result, and said control means further controls the frequency of the clock signal according to an output of said detecting means.

31. An apparatus according to claim 29, wherein said control means includes a counter for counting the clock generated by said generating means during a predetermined time period, a register for holding a comparative value, and comparing means for comparing the comparative value with a count value of said counter, said control means setting the comparative value according to the azimuth angle of each of the plurality of heads.

32. An apparatus according to claim 31, wherein said generating means includes phase-difference detecting means for detecting a phase difference between the clock signal and the reproduced signal, a loop filter for receiving an output of said phase-difference detecting means, and oscillation means for outputting as the clock signal a signal having a frequency corresponding to an output of said loop filter.

33. An apparatus according to claim 32, wherein said control means further includes first adding means for adding an output of said comparing means to the output of said loop filter, detecting means for detecting a tendency of an output of said first adding means and outputting a signal indicative of the tendency, and second adding means for adding the output of said loop filter to the signal outputted from said detecting means, said control means inputting an output of said second adding means to said generating means.

34. An apparatus according to claim 33, wherein said detecting means includes averaging means for averaging the output of said loop filter and integrating means for integrating an output of said averaging means.

35. An apparatus according to claim 34, wherein said detecting means includes a plurality of holding means each of which is provided for holding the output of said first adding means, said plurality of holding means respectively corresponding to the azimuth angles, and third adding means for adding outputs of said plurality of holding means to the output of said first adding means, said second adding means adding an output of said third adding means to the output of said loop filter.

36. An apparatus according to claim 29, wherein said control means varies the frequency of the clock signal according to a transport speed of the recording medium.

37. An apparatus according to claim 29, wherein said generation means generates the clock signal by using the digital signal obtained by said sampling means.

38. An apparatus according to claim 29, further comprising data detection means for obtaining digital data formed by a single bit per sample from the digital signal obtained by said sampling means.

39. An apparatus according to claim 38, wherein said data detection means includes a Viterbi decoding means.

40. An apparatus according to claim 29, wherein the reproduced signal includes an image signal whose information amount is compressed.

41. An apparatus according to claim 40, further comprising expansion means for expanding the information amount of the reproduced signal.

42. A reproducing apparatus, comprising:
reproducing means for reproducing signals from a recording medium by using a plurality of heads including a first head and a second head;
generation means for generating clock signals phase-synchronized with the reproduced signals,
said generation means generating the clock signals of a first frequency when said reproducing means reproduces the signals by using the first head and generating the clock signals of a second frequency different from the first frequency when said reproducing means reproduces the signals by the second head; and
detection means for detecting digital signals from the reproduced signals,
said detection means including sampling means for sampling the reproduced signal according to the clock signals and obtaining signals formed by a plurality of bits per sample,
said detection means detecting the digital signals formed by a single bit per sample according to the signals sampled by said sampling means.

43. A reproducing method, comprising the steps of:
reproducing a signal from a recording medium by using a plurality of heads each having a different azimuth angle;
generating a clock signal phase-synchronized with the reproduced signal;
sampling the reproduced signal by using the clock signal and obtaining a digital signal formed by a plurality of bits per sample; and
controlling a clock-signal generating operation of said generation step, said control step varying a frequency of the clock signal according to the azimuth angle of each of the plurality of heads.

* * * * *

UNITED STATES PATENT AND TRADEMARK OFFICE
CERTIFICATE OF CORRECTION

PATENT NO. : 5,774,290
DATED : June 30, 1998
INVENTOR(S) : Yoshiyuki Sasaki, et al.

It is certified that error appears in the above-identified patent and that said Letters Patent is hereby corrected as shown below:

Col. 5, line 13, delete "a" and insert -- 3a --.
Col. 5, line 55, delete "$T_{r_i}$" and insert -- $T_{r\ell}$ --.
Col. 5, line 63, delete "$L_{1{\neq}\phi6}$" and insert -- $L_1$ --.
Col 7, line 54, delete "a and b" and insert -- 3a and 3b --.
Col. 7, line 58, after "switching" insert -- - --.
Col. 10, line 39, delete "mag netic" and insert -- magnetic --.
Col. 10, line 40, delete "S$_{earch}$" and insert -- search --.
Col. 10, line 44, delete "s ignal" and insert -- signal --.
Col. 10 line 46, delete "circui t " and insert -- circuit --.
Col. 10, line 48, delete "a t " and insert -- at --.
Col. 10, line 52, delete "sw itch" and insert -- switch --.
Col. 10, line 60, delete "described" (second occurrence).
Col. 11, line 1, delete "b e" and insert -- be --.
Col. 11, line 8, delete "in tegrator" and insert -- integrator --.
Col. 11, line 10, delete "DcA" and insert -- D/A --.
Col. 11, line 12, delete " - " and insert --  --.
Col. 11, line 19, delete "int egrator" and insert -- integrator --.
Col. 16, line 16, delete "i e" and insert -- the --.
Col. 19, line 18, delete "p1".

Signed and Sealed this

Second Day of February, 1999

Attest:

Attesting Officer

*Acting Commissioner of Patents and Trademarks*